US005771064A

United States Patent [19]
Lett

[11] Patent Number: 5,771,064
[45] Date of Patent: Jun. 23, 1998

[54] HOME COMMUNICATIONS TERMINAL HAVING AN APPLICATIONS MODULE

[75] Inventor: David B. Lett, Duluth, Ga.

[73] Assignee: Scientific-Atlanta, Inc., Norcross, Ga.

[21] Appl. No.: 564,020

[22] Filed: Nov. 29, 1995

[51] Int. Cl.[6] .................................................. H04N 7/16
[52] U.S. Cl. ................................ 348/10; 348/6; 455/6.2; 455/6.3
[58] Field of Search ............................... 348/10, 11, 12, 348/13, 6, 7, 14, 15, 16, 17, 18; 455/4.2, 4.1, 5.1, 6.1, 6.2, 6.3, 349; 358/84; 395/200.09; 379/10, 14, 207, 201, 357; 364/514 R, 514 A; 380/5, 10, 15, 20, 50; H04N 7/16, 7/173

[56] References Cited

U.S. PATENT DOCUMENTS

| | | | |
|---|---|---|---|
| 4,982,430 | 1/1991 | Frezza et al. | 380/50 |
| 5,003,591 | 3/1991 | Kauffman et al. | 380/10 |
| 5,367,571 | 11/1994 | Bownen et al. | 348/10 |
| 5,440,632 | 8/1995 | Bacon et al. | 348/3 |
| 5,583,563 | 12/1996 | Wanderscheid et al. | 348/13 |

*Primary Examiner*—John K. Peng
*Assistant Examiner*—Chris Grant
*Attorney, Agent, or Firm*—Banner & Witcoff, Ltd.

[57] ABSTRACT

A home communications terminal for use in a communications network is provided. The home communications terminal includes an applications module and a subscriber terminal module. The applications module has a memory including a first memory portion, and a processing unit for executing program code stored in the first memory portion of the memory of the applications module. The subscriber terminal module has a memory including a first memory portion for storing a first boot-loader program, and a second memory portion for storing a second boot-loader program. A processing unit of the subscriber terminal executes the first boot-loader program to load program code in the second memory portion of the memory of the subscriber terminal module and executes the second boot-loader program to load program code in the first memory portion of the memory of the applications module.

5 Claims, 19 Drawing Sheets

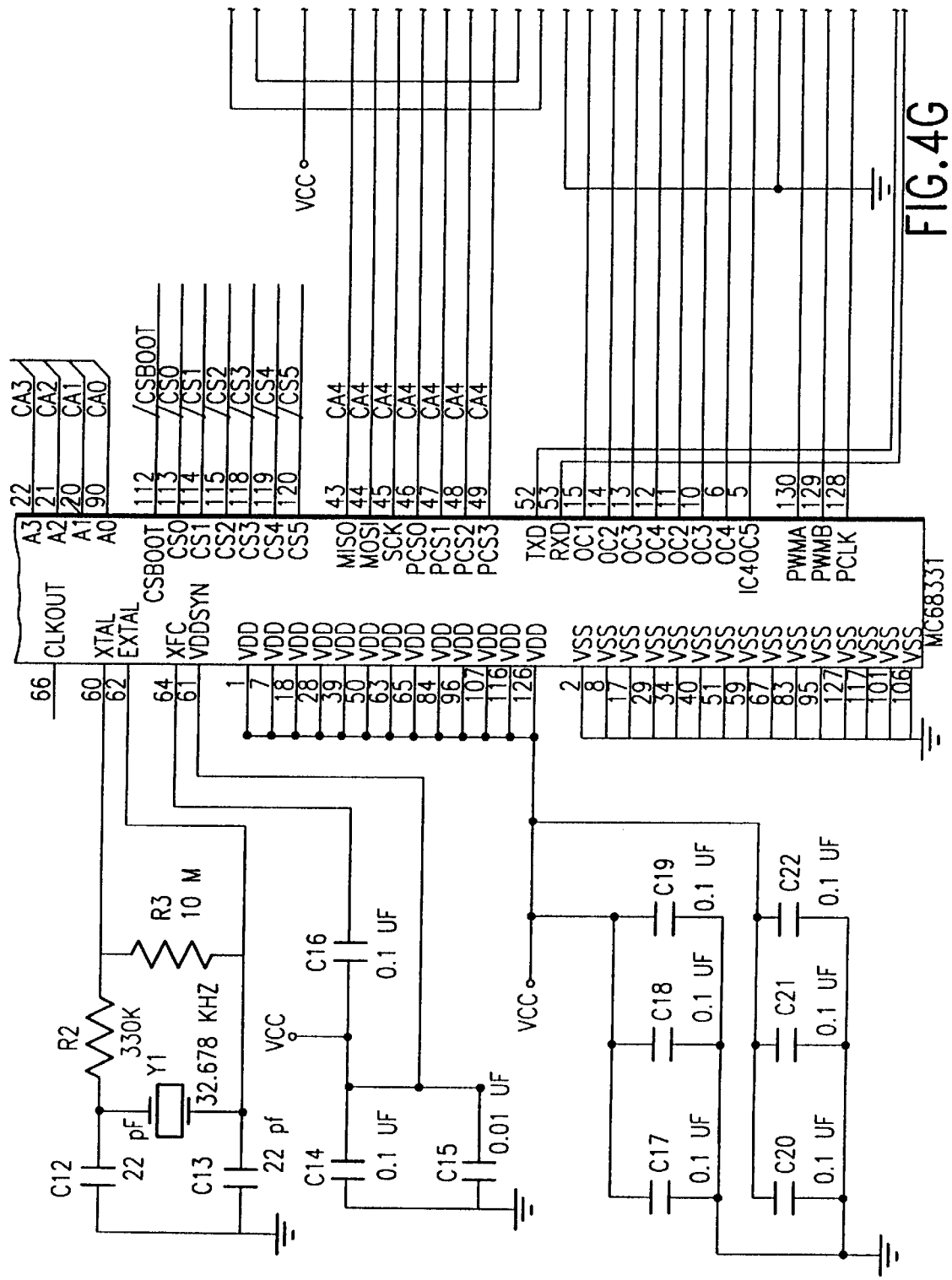

| 0 | 1 | | | | | |
|---|---|---|---|---|---|---|
| 1 | BLANK | | | | | |
| 2 | BLANK | | | | | |
| 3 | BLANK | | | | | |
| 4 | 0 | 1 | 0 | 0 | BLANK | |
| 5 | ID EGPT | | | | | PARAMETERS DEFINITIONS |

| 0 | 1 | | | | | |
|---|---|---|---|---|---|---|
| 1 | BLANK | | | | | |
| 2 | BLANK | | | | | |
| 3 | BLANK | | | | | |
| 4 | 0 | 1 | 0 | 0 | BLANK | |
| 5 | ID IGPT | | | | | PARAMETERS DEFINITIONS |

| 0 | 1 | | | | | |
|---|---|---|---|---|---|---|
| 1 | BLANK | | | | | |
| 2 | BLANK | | | | | |
| 3 | BLANK | | | | | |
| 4 | 0 | 1 | 0 | 0 | BLANK | |
| 5 | ID AGPT | | | | | PARAMETERS DEFINITIONS |

HOME COMMUNICATIONS TERMINAL HAVING AN APPLICATIONS MODULE

BACKGROUND OF THE INVENTION

1. Technical Field

The present invention generally relates to home communications terminals for subscription television systems and, more particularly, to providing such terminals having an applications module for providing increased flexibility and new and/or upgraded features.

2. Description of Related Art

The subscriber terminal, more commonly known as a set top terminal, is an integral component of subscription television systems. These subscription television systems can be cable television (CATV) systems, SMATV systems, a multi-point, multidistribution subscription system (MMDS), or a direct-to-home (DTH) type of system. The terminals have conventionally provided the functions of tuning particular channels of the subscription system which are outside the capability of the subscriber's television. Further, they provide conditional access to the particular subscription service through authorization codes and in many services provide tiering or authorization of particular channels of the service by descrambling.

More recently, the subscriber terminal has become user friendly by providing an interactive, on-screen display and other user functions that allow the subscriber to manipulate the cable service and his television receiver in additional manners. These features include such things as volume control, pay-per-view event confirmation, favorite channel listings, sleep timer features, parental control capability, messaging, program timers for recording VCR programs and other types of consumer friendly operational features.

In addition, some of the features found in newer television receivers can be provided for older receivers by the subscription terminal. For example, channel identifiers, mute and remote volume control can be accomplished by the subscriber terminal making the subscriber's television receiver appear to be a newer model with these capabilities.

An advantageous example of a subscriber terminal with these advanced consumer features is the 8600 Model series of subscriber terminals manufactured by Scientific-Atlanta, Inc. of Norcross, Ga.

The subscriber terminals generally operate under the control of a microprocessor which has a control program stored in a read only memory (ROM), or a non-volatile memory such as a EPROM. The subscriber terminal may also include other volatile memory such as DRAM to allow for the additional temporary storage of data and other information. The memory of whatever type is generally limited to the particular purposes and features that are originally designed for the subscriber terminal because of cost. Therefore, upgrades to the features of a subscriber terminal which require additional memory space usually demand replacement of at least the memory modules and/or the deletion of some of the presently installed features. If the control processor is not powerful enough to process the additional features, it must also be replaced with a consequent reprogramming of the central software.

Because of the wide dispersion and number of subscriber terminals in a subscription television system, several hundred thousand and usually one per household for a CATV system, the cost and difficulty of replacing such terminals on a system basis is prohibitive.

This prevents features which could be provided much sooner to subscribers to only be available over long phase in periods where one model is being taken out of service and another is being placed in service.

Further, it makes it difficult for a subscriber to obtain a full feature set of a subscriber terminal, even if he would pay for some features which are important to him. Additional features because of the extra hardware burden on each terminal must be justified on a system wide basis. If only a few subscribers will pay for an additional feature the cost system wide for the extra memory or processing power to provide the feature could outweigh any potential revenues from that feature.

What is needed is a way to individually and/or universally upgrade, add or change features without having to replace the entire subscriber terminal.

The difficulty of providing additional features for different consumers and upgrading has been addressed with varying degrees of success by some in the consumer industry. For example, many personal computer manufacturers provide a mother board which is attached to a bus connected to a number of expansion slots. Each expansion slot in this open architecture system can be used to configure a different system with the purchase of additional peripheral boards which plug into the slots.

An open architecture is somewhat incompatible with subscriber terminal for subscription television systems. In the past, many of the microprocessors of the subscriber terminals did not have the processing power to handle additional features. More importantly, the subscriber terminal is provided as a secure device which provides conditional access for the premium programming of the subscription service. An open architecture which would encourage a subscriber to open the outer cover of the terminal could be inimical to this security. Further, additional features generally require some change in the signals to or from the subscription service provider.

SUMMARY OF THE INVENTION

In accordance with a first aspect of the present invention, a home communications terminal for use in a communications network is provided. The home communications terminal includes an applications module and a subscriber terminal module. The applications module has a memory, and a processing unit for executing program code stored in the memory of the applications module. The subscriber terminal module has a memory for storing a first boot-loader program and a second boot-loader program. A processing unit of the subscriber terminal executes the first boot-loader program to load program code in the memory of the subscriber terminal module and executes the second boot-loader program to load program code in the memory of the applications module.

These and other objects, features and aspects of the invention will be more clearly understood and better described if the following detailed description is read in conjunction with the appended drawings.

BRIEF DESCRIPTION OF THE DRAWINGS

FIGS. 6A, 6B, 6C, 6D, 6E, and 6F are pictorial representations of several download program code parameters transactions which the system uses to request the downloading of new program code to the home communications terminal.

DETAILED DESCRIPTION

Figure 1:
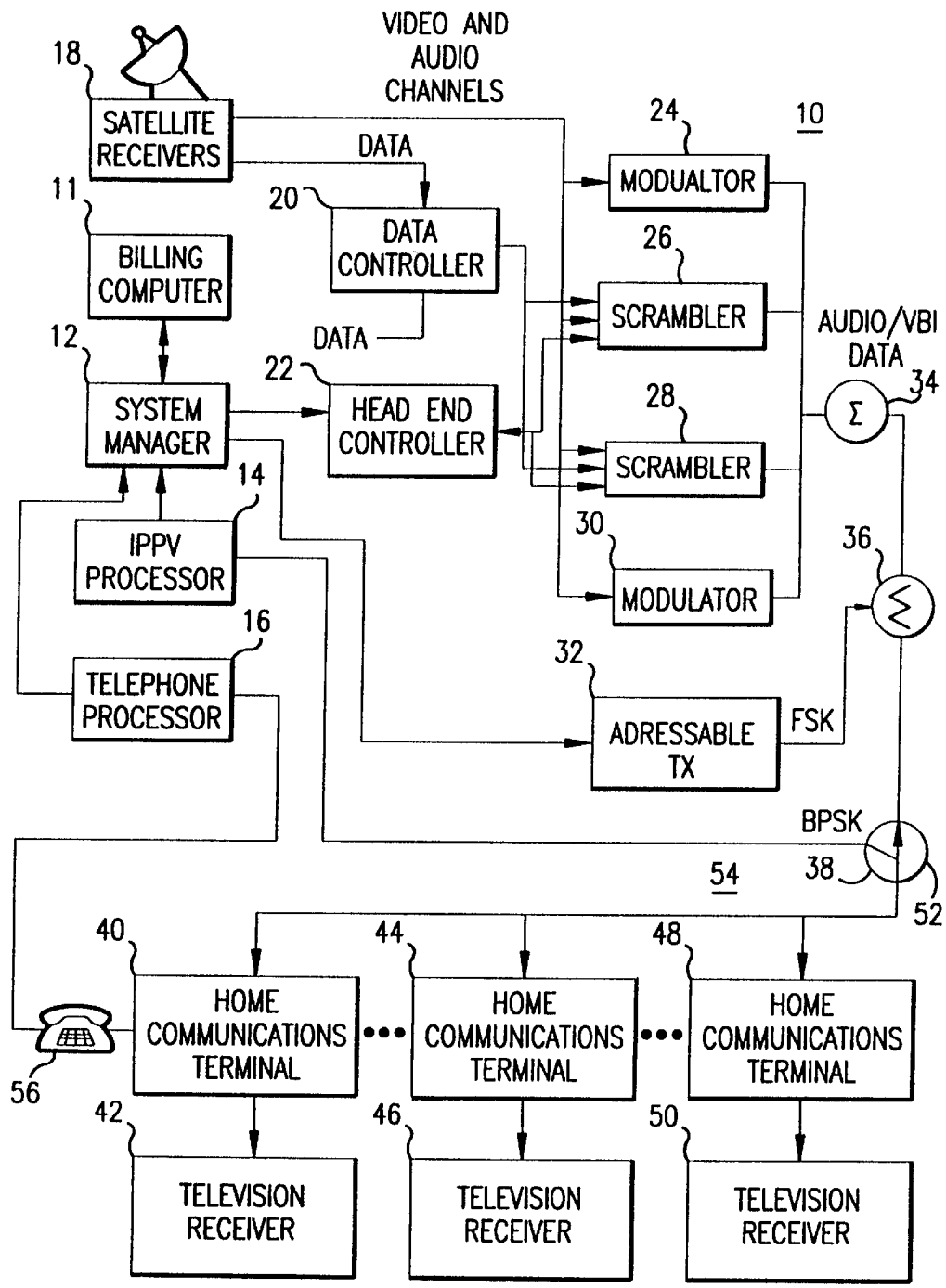
FIG. 1 is a system block diagram of a subscription television system of the CATV type which includes a multiplicity of home communications terminals.

A subscription television system of the CATV type is more fully illustrated in FIG. 1. The subscription television system includes a headend 10 and a plurality of home communications terminals (HCTs) 40, 44 and 48 which are connected over a distribution system 52. Home communications terminals 40, 44, and 48 each include a subscriber terminal module and, optionally, an applications module as will be described below. It will be appreciated although elements 40, 44, and 48 are designated as "home" communications terminals, their use is not limited to use in a home. Such terminals may be utilized, for example, in hotel rooms, businesses, schools, hospitals, etc. As is conventional, distribution system 52 may include coaxial or optical fiber cable, system amplifiers, line extenders, etc. Headend 10 is under the supervision of a system manager 12 which controls a hardware controller, headend controller 22. A billing computer 11 communicates with system manger 12 to authorize and transmit transactions to subscribers.

The television or other programming for the subscription system may come from a satellite downlink where it is decoded and demodulated by satellite receivers 18 into a number of channels. Each channel is either applied to a modulator 24 and 30 or a scrambler and modulator 26 and 28 which, under the control of headend controller 22, remodulates the channels to the frequencies of the local subscription system channel line up. For a premium or restricted channel service (tiered pay-per-view, or the like), some channels are scrambled by any of the known CATV methods by scramblers and modulators 26 and 28, while the other channels can be transmitted without conversion. The program channels are then frequency division multiplexed onto distribution system 52 by an RF combiner 34 as a broadband television signal. The plurality of channels of programming can then be transmitted over distribution system 52 and supplied to each of home communications terminals 40, 44, and 48.

Scramblers and modulators 26 and 28 further may include the function of data insertion for its particular channel. This method of providing the data within the channel signal is generally termed in-band signaling. The data may be applied to any audio portion, video portion or both audio and video portions in combination, or any other portion of the television channel. Many subscription television systems have amplitude modulated data pulses on the audio subcarrier. Further, in other subscription television systems, data may be inserted into the vertical and/or horizontal blanking intervals of the video portion.

The data which is inserted into the television channel in this manner can be conditional access data to globally or locally address and control home communications terminals 40, 44 and 48, on screen text data, or other types of information from headend controller 22. Other data and information, such as electronic program guides, and information services, can be inserted into the channels from a data controller 20. Data controller 20 can receive local data or national data from the satellite downlink through satellite receiver 18.

In addition, data can be transmitted over distribution system 52 by out-of-band signaling. In this mode, system manager 12 accesses an addressable transmitter 32 with transactions to transmit this data. Addressable transmitter 32 may be used to modulate a data signal on a frequency not associated with the television programming. The broadband television programming of the cable systems has generally been applied from 50 MHz to 550 MHz and above, while out-of-band signaling systems have been used in non-video portions of these signals, such as at 108.2 MHZ with a frequency shift keying modulation technique. These transactions are combined with the broadband television signal at RF combiner 36 and transmitted to home communications terminals 40, 44 and 48.

Transactions in the system are designated as addressed (to a particular home communications terminal or group of home communications terminals) and global (to all home communications terminals). These transactions are in a standardized format which can be sent over any of the communication paths mentioned.

Signaling and data information may also flow in the reverse direction from the home communications terminals to the headend via a reverse signaling path through distribution system 52. In one form, the reverse signals are digital biphase shift keying (BPSK) modulated and applied to a frequency below 50 MHZ. The signals flow back from the home communications terminals to an IPPV processor where they are decoded. In addition, any of home communications terminals 40, 44 and 48 may include a modem and telephone link 56 to a telephone processor 16 at headend 10. The information from processors 14 and 16 are directed to system manager 12, which communicates to billing computer 11 to obtain authorization and billing information. The reverse signaling system has generally been used for ordering pay-per-view (PPV) or impulse-pay-per-view (IPPV) events. In the future, the reverse signal path may be used for any number of additional interactive services.

Figure 2A:
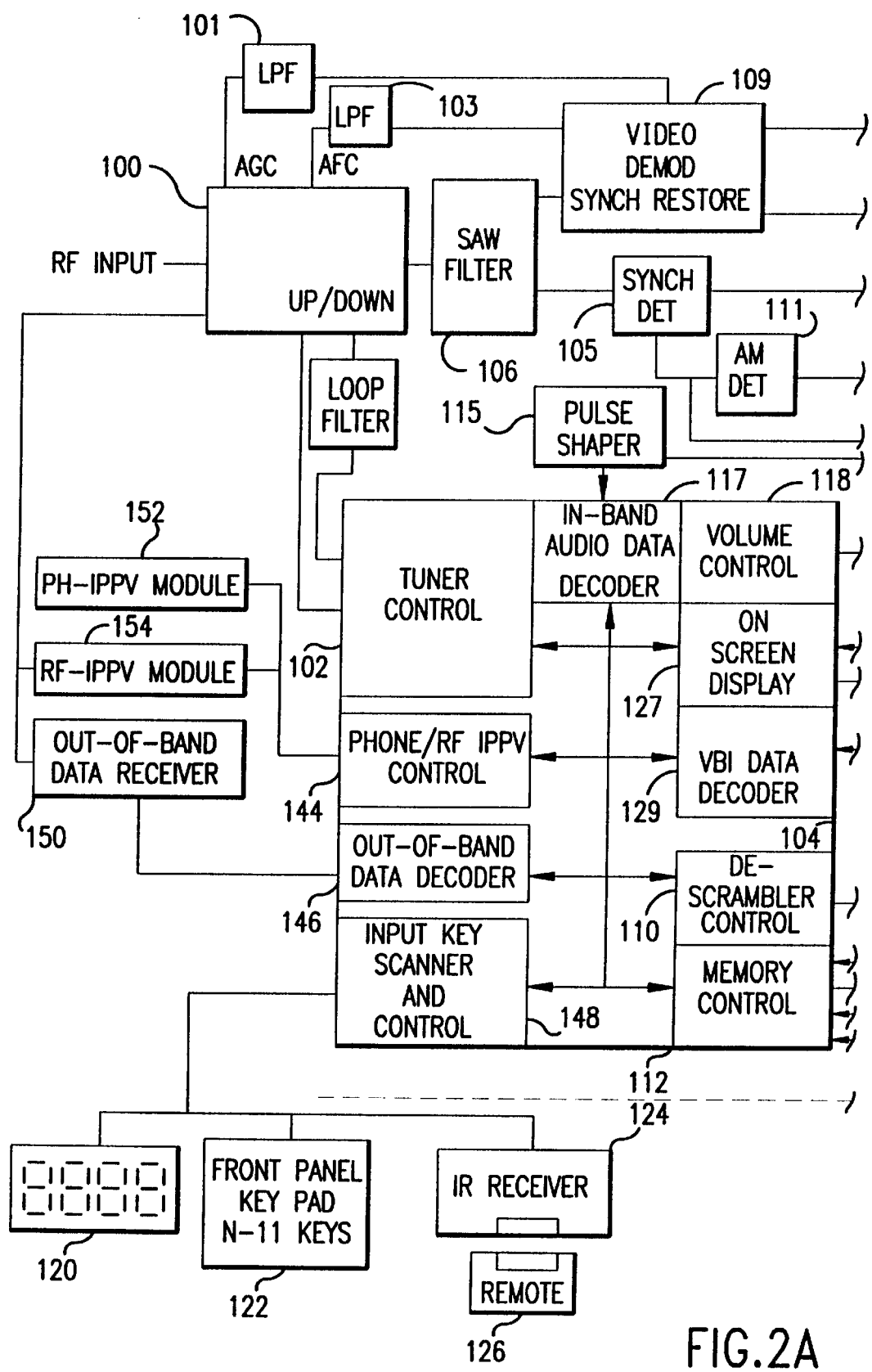
FIGS. 2A and 2B are a detailed block diagram of one of the home communications terminals of the system illustrated in FIG. 1.
Figure 2B:
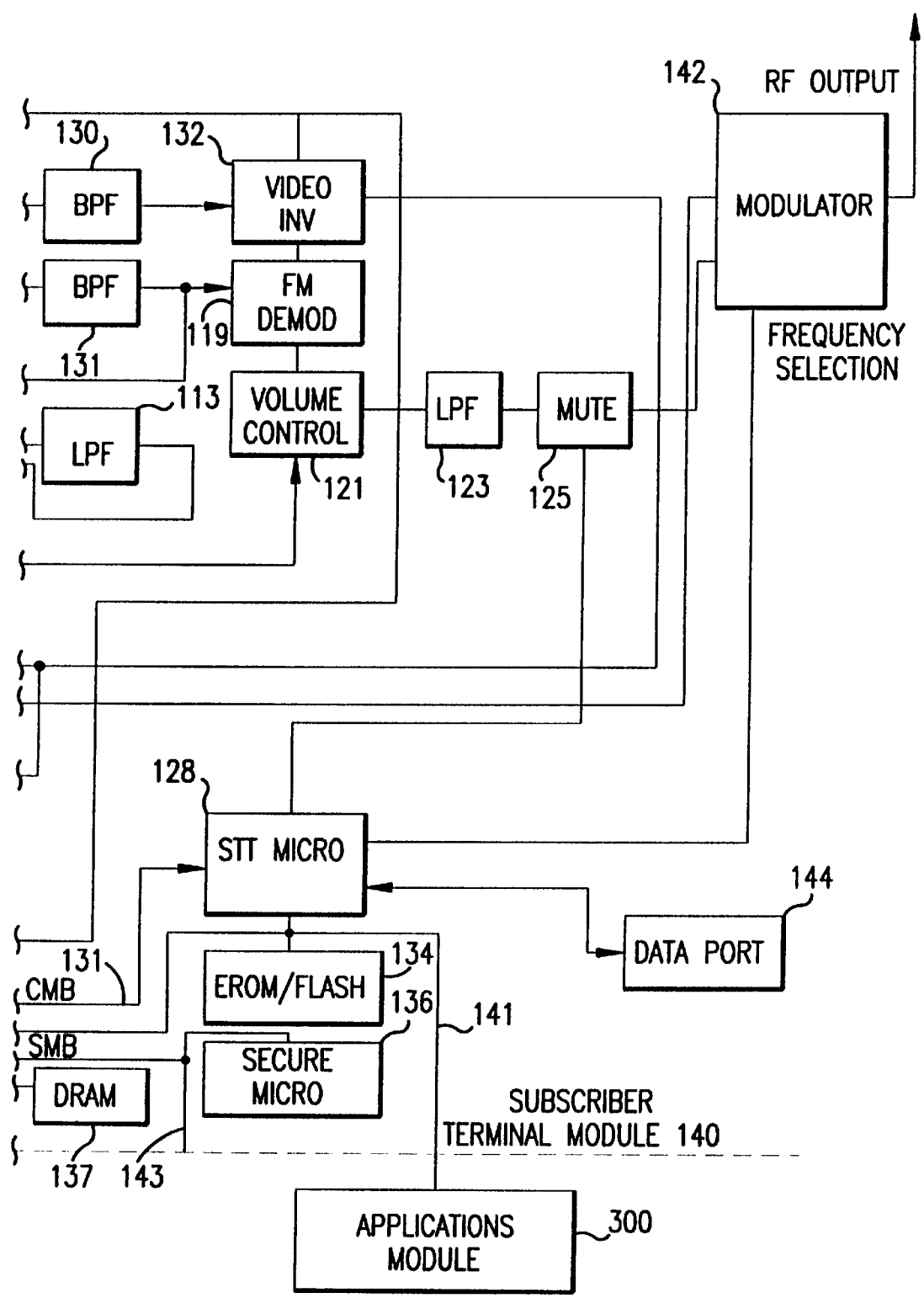

Referring to FIGS. 2A and 2B a detailed block diagram of one of the home communications terminals, for example, the one indicated as 40 of the subscription television system will now be described. Home communications terminal 40 includes a subscriber terminal module 140 and an applications module 300. The broad band television signal from signal distribution system 52 is received at the input of up/down converter or tuner 100. An out-of-band data receiver 150 is also coupled to the broadband input. Conventionally, up/down converter 100 may include an input filter, such as a diplexer, to separate the 108.2 MHz out-of-band signal and the broadband television signal. Up/down converter 100 can be tuned to a predetermined channel for receiving in-band video and audio data when not in use. The channel may be predetermined from system manager 12 and, by one of the data transmission methods described herein, the predetermined channel identification can be stored in home communications terminal 140.

When in use, up/down converter 100 is tuned according to a channel entered by a subscriber via a user interface having an IR receiver 124, remote control 126 and terminal keypad 122. Up/down converter 100 uses a phase locked loop under the control of a tuner control 102 to convert the selected or predetermined default RF channel signal to a 45.75 MHz intermediate frequency (IF) signal. A multifunction control circuit (MCC) 104, preferably an application specific integrated circuit (ASIC) combining many subscriber terminal module control and data handling functions into a single package, is linked to up/down converter 100 by a bidirectional link to tuner control 102. The link has one path for tuning and a return link for feedback control of the tuning process. A feedback signal for automatic gain control and one for automatic frequency control are transmitted to up/down converter 100 through filters 101, 103, respectively from a video demodulator 109.

A filter, such as a SAW filter 106, filters the IF channel signal to split the signal into separate video and audio portions for further processing. The video portion is demodulated and descrambled by video demodulator 109 under the control of a descrambler control 110 of MCC 104. Video demodulator 109 performs the sync restoration (descrambling of the video signal) for sync suppression scrambling. The video signal then passes through a band pass filter 130 and to a video inverter 132 where inverse video inversion (descrambling) takes place. The descrambling of the video portion, whether sync suppression, sync inversion, video line inversion, etc. is under the control of descrambler control 110 of MCC 104. Descrambler control 110 provides the necessary timing signals, inversion axis levels, and whether the video is inverted or not to video inverter 132 and supplies the necessary timing, restoration levels and identification of sync pulses to be restored to video demodulator 109. Descrambler control 110 usually receives such descrambling information from pulses as in-band audio data.

In the other path, the audio signal is converted from the 41.25 MHz IF carrier to the intermodulation frequency of 4.5 MHz by a synchronous detector 105. Feedback for automatic gain control of detector 105 is supplied from the output of a band pass filter 131. The audio signal may then be demodulated by an FM demodulator 119. An amplitude modulation detector 111 performs pulse detection to recover the in-band audio data which are amplitude modulated onto the audio carrier. The recovered in-band pulses are supplied to an in-band audio data decoder 117 of MCC 104 for processing after being shaped by a pulse shaper 115. The in-band data, except for descrambling data, is stored in a DRAM 137 for buffering. Descrambler control 104 accesses descrambling data directly for the video descrambling operation. Volume control of the audio signal is performed under the control of a volume control 118 of MCC 104 and a control microprocessor 128 as described in U.S. Pat. No. 5,054,071, incorporated herein by reference. After volume control, the audio signal is passed through a low pass filter 123 and a mute switch 125. The output of mute switch 125 is applied to a modulator 142.

MCC 104 receives the video signal after demodulation and descrambling and strips the in-band video data from the VBI of the signal with a VBI decoder 129. The in-band video data is transmitted at a frequency on the order of known teletext systems, such as about 4.0 megabits per second, and a data clock provides an appropriate sampling frequency higher than the Nyquist rate according to well known techniques. In-band decoder 129 stores the data in DRAM 137 prior to processing by microprocessor 128, DRAM 137 serving as a data buffer.

The output of video inversion circuit 132 is also supplied to an on screen display control 127 of MCC 104. On screen display control 127 selectively generates on screen character and graphic displays in place of or overlaid on the video signal. Modulator 142 combines the video signal from the output of on screen display control 127 and the audio signal from the output of mute circuit 125 and converts the combined signal to the channel frequency selected by control microprocessor 128, such as channel ¾ for NTSC. The combined and remodulated signal is supplied as an RF output to a television receiver in well known manner.

Control microprocessor 128 controls the overall operation of the subscriber terminal module 140. The subscriber communicates to and controls microprocessor 128 through an interactive user interface with an on screen display. The user interface includes a keyboard 122 on the front panel of subscriber terminal module 140 and a remote 126 which generate subscriber control signals for channel tuning, volume level control, feature selection, and the like. These subscriber control commands are decoded by an input scanner and control 148 of MCC 104. A remote IR receiver 124 of the user interface receives the commands from the infrared (IR) or other remote control 126, as is well known in the art, and provides commands to control microprocessor 128. The user interface additionally includes a 4 digit, 7 segment LED display 120 which displays the tuned channel numbers and diagnostics.

When keyboard 122 or IR remote control 126 is utilized to select a command, control microprocessor 128 operates to execute the command. For example, this operation may be to instruct tuner control 102 to appropriately control up/down converter 100 to tune a selected channel. The subscriber terminal module interacts with the subscriber by providing numerous on screen displays which assist in the operation of the subscriber terminal module. The on screen displays provide information and prompts to guide the subscriber through many of the complex features of the terminal. An example of on screen display screens for assisting in the operation of the subscriber terminal module is described in commonly assigned application Ser. No. 07/800,836, which is incorporated herein by reference.

Descrambler control 110 of MCC 104 utilizes recovered descrambling data to generate appropriate control signals, for example, inversion control and equalizing, sync restoration or regeneration for descrambling, or otherwise restoring the input baseband television signal. A secure microprocessor 136 determines whether descrambler control 110 of MCC 104 carries out descrambling on a particular channel or what form of descrambling is required at a particular time by interpreting the authorization and control data downloaded from system manager 12 (by any of the three data transmission schemes discussed herein, out-of-band, in-band audio or in-band video) into the internal non-volatile memory (NVM) of the device. The NVM in secure microprocessor 136 stores secure data, for example, authorization data, scrambled channel data, scrambling mode data, some subscriber terminal module configuration data and other required data.

Control microprocessor 128 operates by running a control program which preferably is partially stored in a read-only memory internal to the processor and partially stored in a non-volatile memory such as Flash EPROM memory 134. Control microprocessor 128 communicates with the non-volatile memory 134 and an applications module 300 via a memory bus 141 which has data, address, and control lines. In addition, control microprocessor 128 controls data decoders 117, 129 and 146 and tuner control 102, volume control 118, on-screen display control 127, descrambler control 110 and input key scanner and control 148 via commands through MCC 104 and control microprocessor bus (CMB) 131. Control microprocessor 128 also directly controls mute switch 125 and the output frequency selection of modulator 142. Control microprocessor 128 includes additional capacity for other auxiliary device communications and control through a data port 144.

Memory control 112 permits data coming from the three data decoders 117, 129 and 146 to be placed in a volatile memory such as DRAM 137. There it can be accessed by control microprocessor 128 via CMB 131. MCC 104 also distributes control instructions from control microprocessor 128 to the other parts of MCC 104 to provide operation of the rest of subscriber terminal module 140. MCC 104 additionally connects to a secure microprocessor bus (SMB) 143 which permits communications between secure microprocessor 136 and other portions of subscriber terminal module 140.

Memory control 112 and the microprocessor interfaces of MCC 104 are the central communications facility for control microprocessor 128 and secure microprocessor 136. Memory control 112 receives requests to write to memory or read from memory from microprocessors 128, 136 and the other controls and data decoders. It resolves contentions for memory transfers, giving priority to real time applications and the microprocessors, and schedules the data flow. Microprocessors 128 and 136 communicate through internal registers of MCC 104 with memory control 112 and other portions of the MCC.

Applications module 300 is a "sidecar" module which contains memory and microprocessor components (as will be described in greater detail below) and which can be connected to a connector 200 (see FIG. 9). Connector 200 electrically extends control microprocessor memory bus 141 and secure microprocessor bus 143. In the implementation described below, applications module 300 does not utilize secure microprocessor bus 143. However, it will be apparent that other implementations of the applications module may utilize secure microprocessor bus 143, for example, to provide renewable security as described in commonly assigned U.S. Pat. No. 5,367,571, which is incorporated herein. Additional features may be provided by applications module 300 as will be explained in detail below.

The subscriber terminal module may optionally include an impulse pay-per-view (IPPV) module of either the telephone type 152 or the RF-IPPV type 154. The IPPV module allows the subscribers to request authorization of their subscriber terminal module 140 to receive pay-per-view events, store the data associated with the purchase of the event in the non-volatile memory of secure microprocessor 136, and then transmit the data to system manager 12 via the telephone return path or the RF return path via signal distribution system 52.

Figure 3:
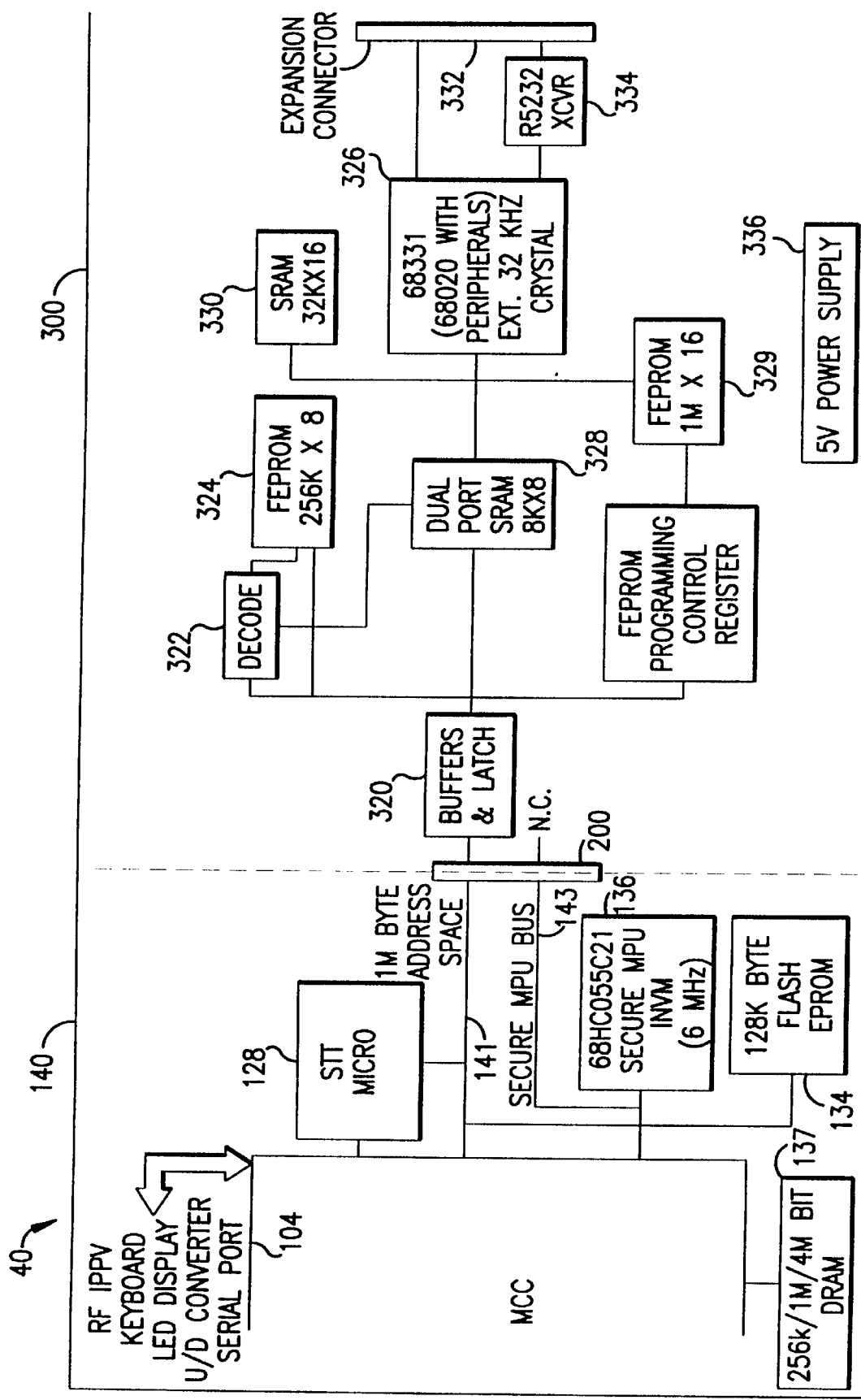
FIG. 3 is a detailed block diagram of the applications module of the home communications terminal of FIGS. 2A and 2B.
Figure 4:
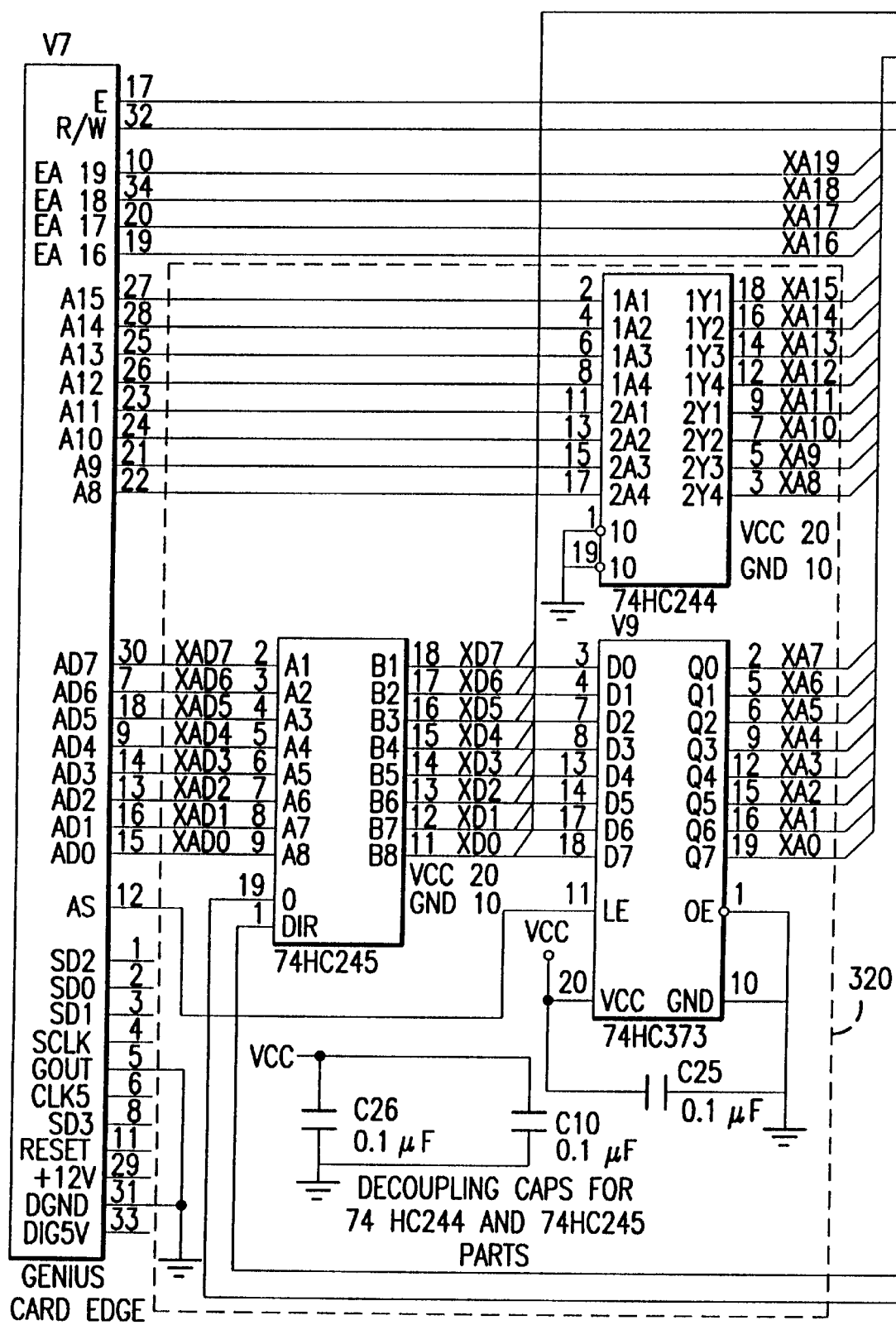
FIGS. 4A–4H are schematic circuit diagrams of the applications module shown in FIG. 3.
Figure 4A:
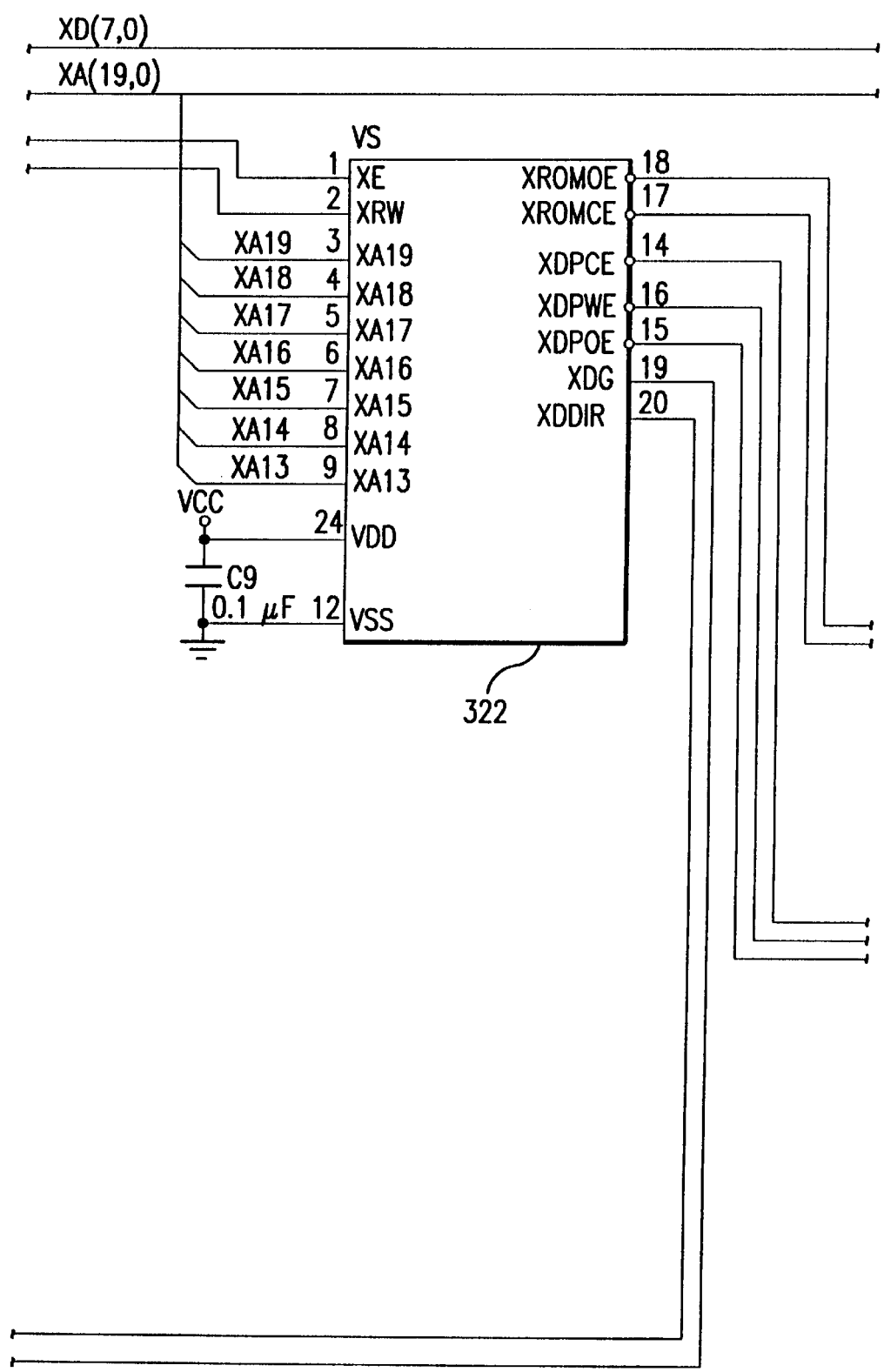
Figure 4B:
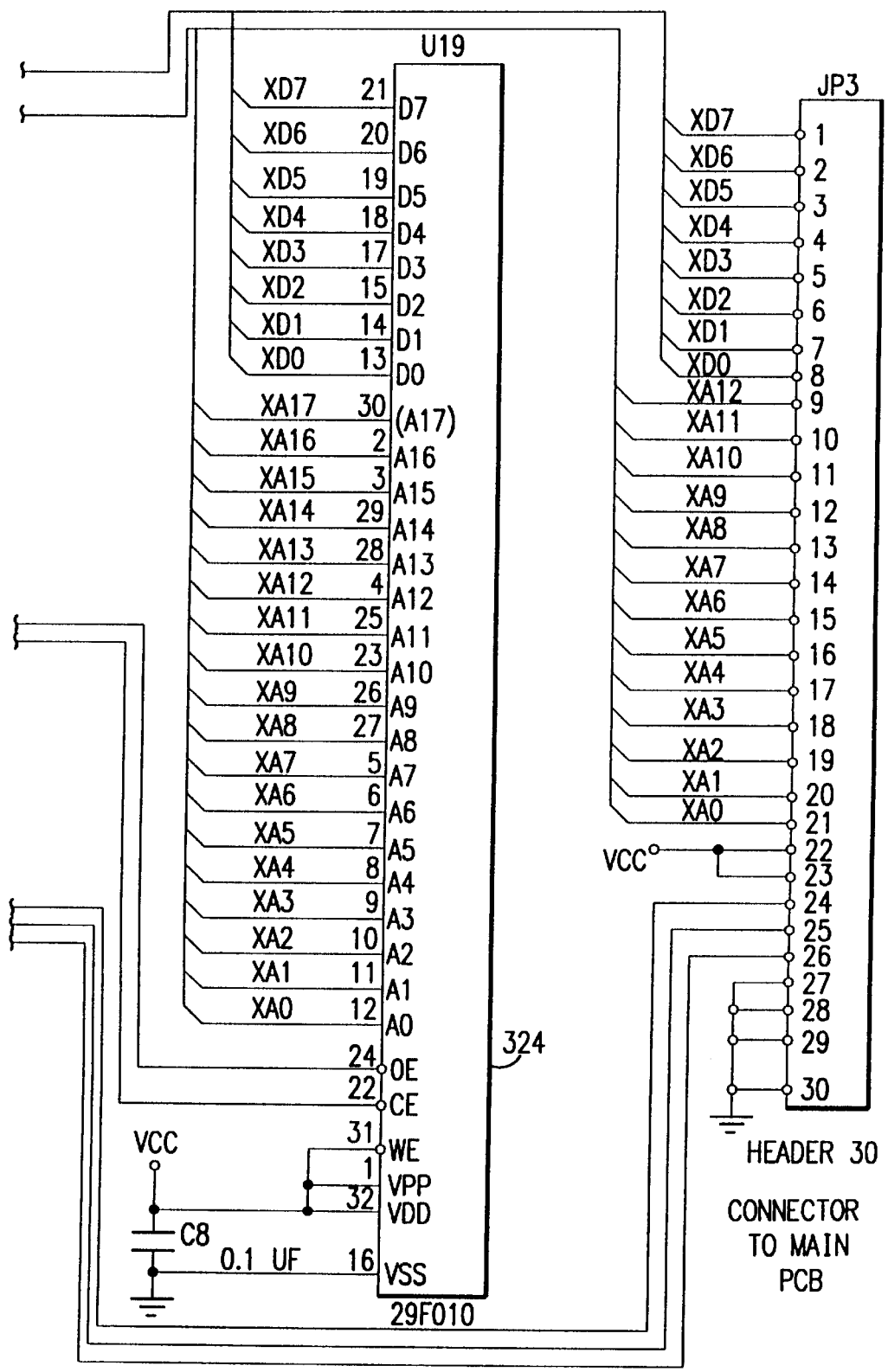
Figure 4C:
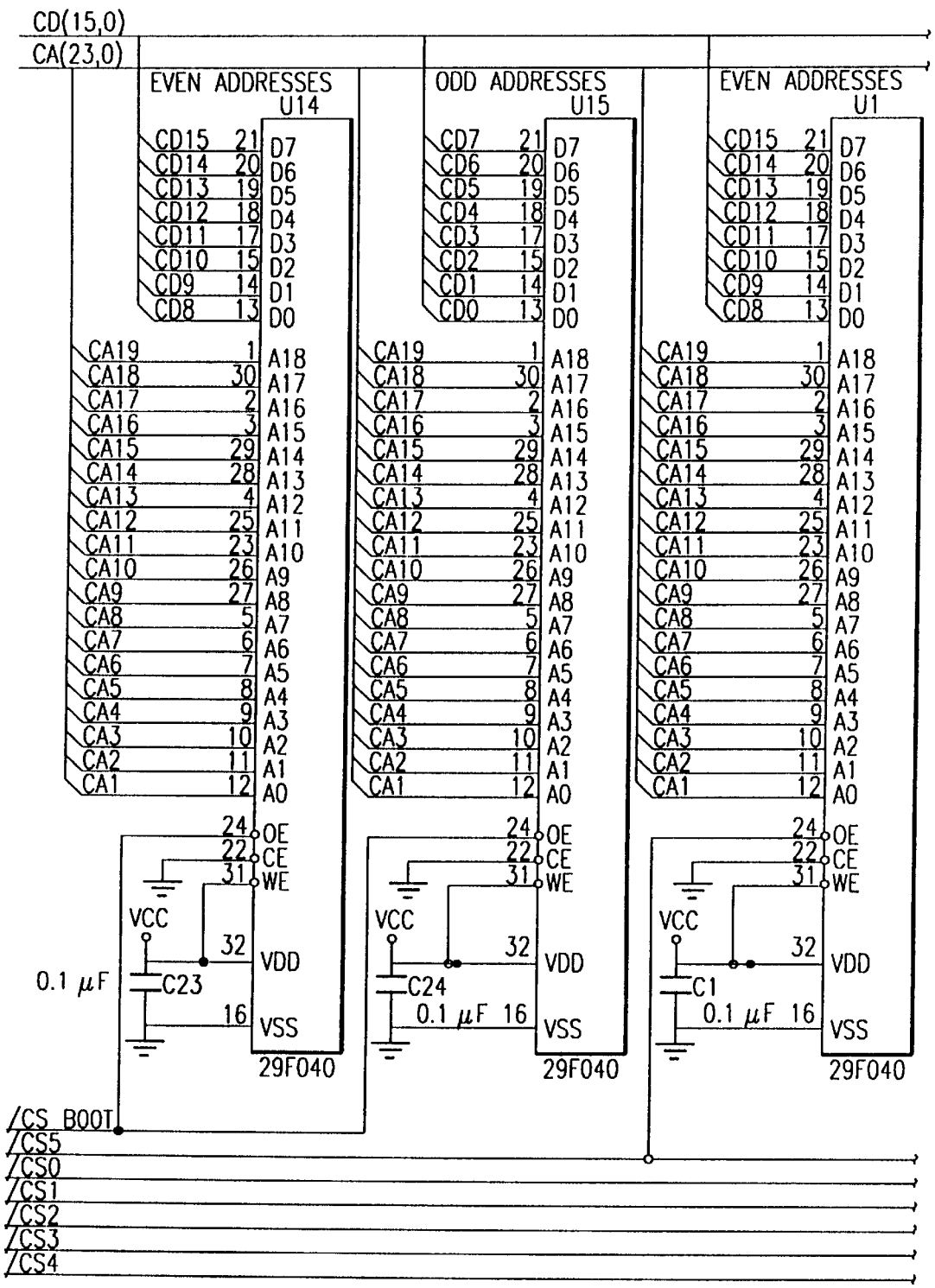
Figure 4D:
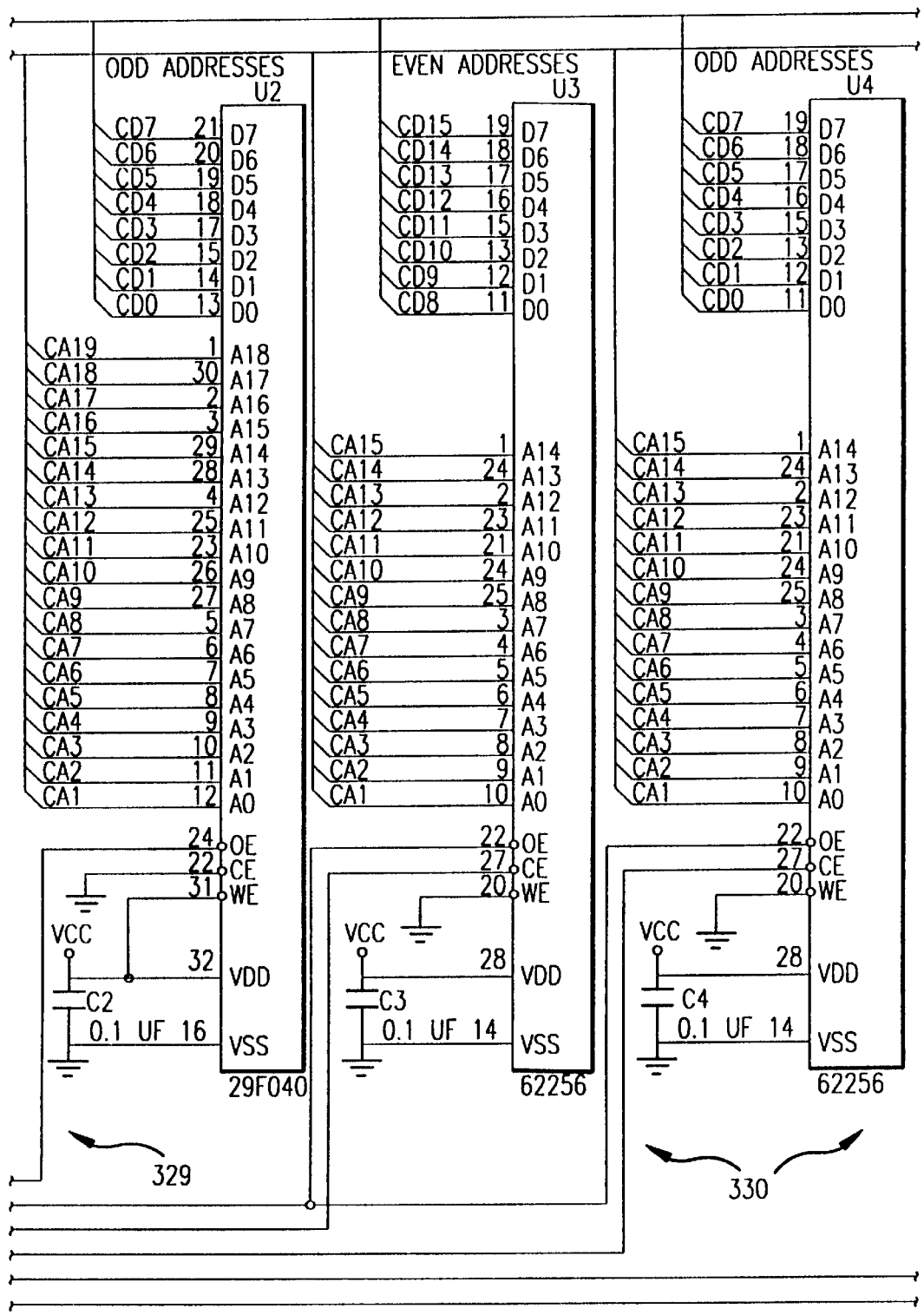
Figure 4E:
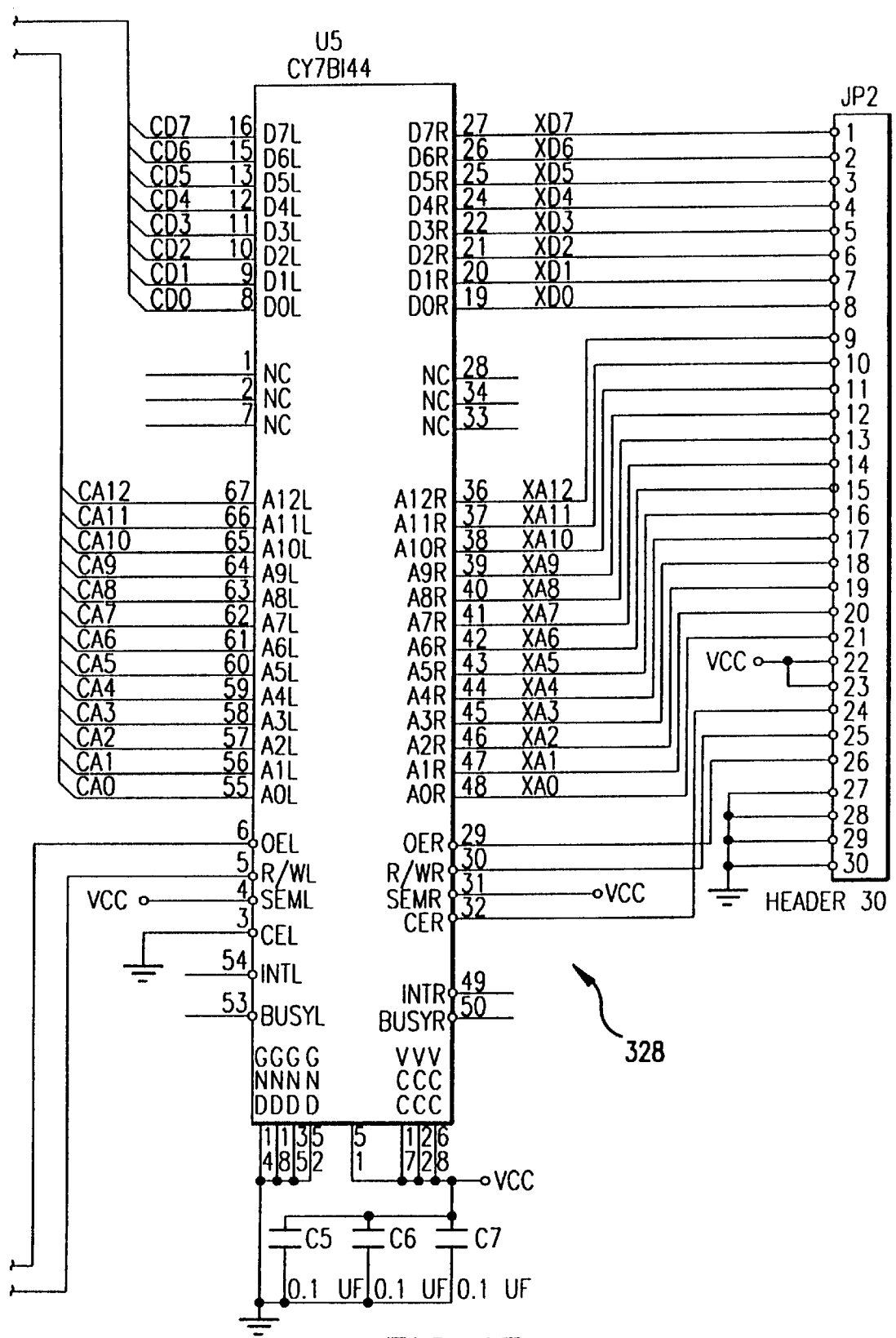
Figure 4F:
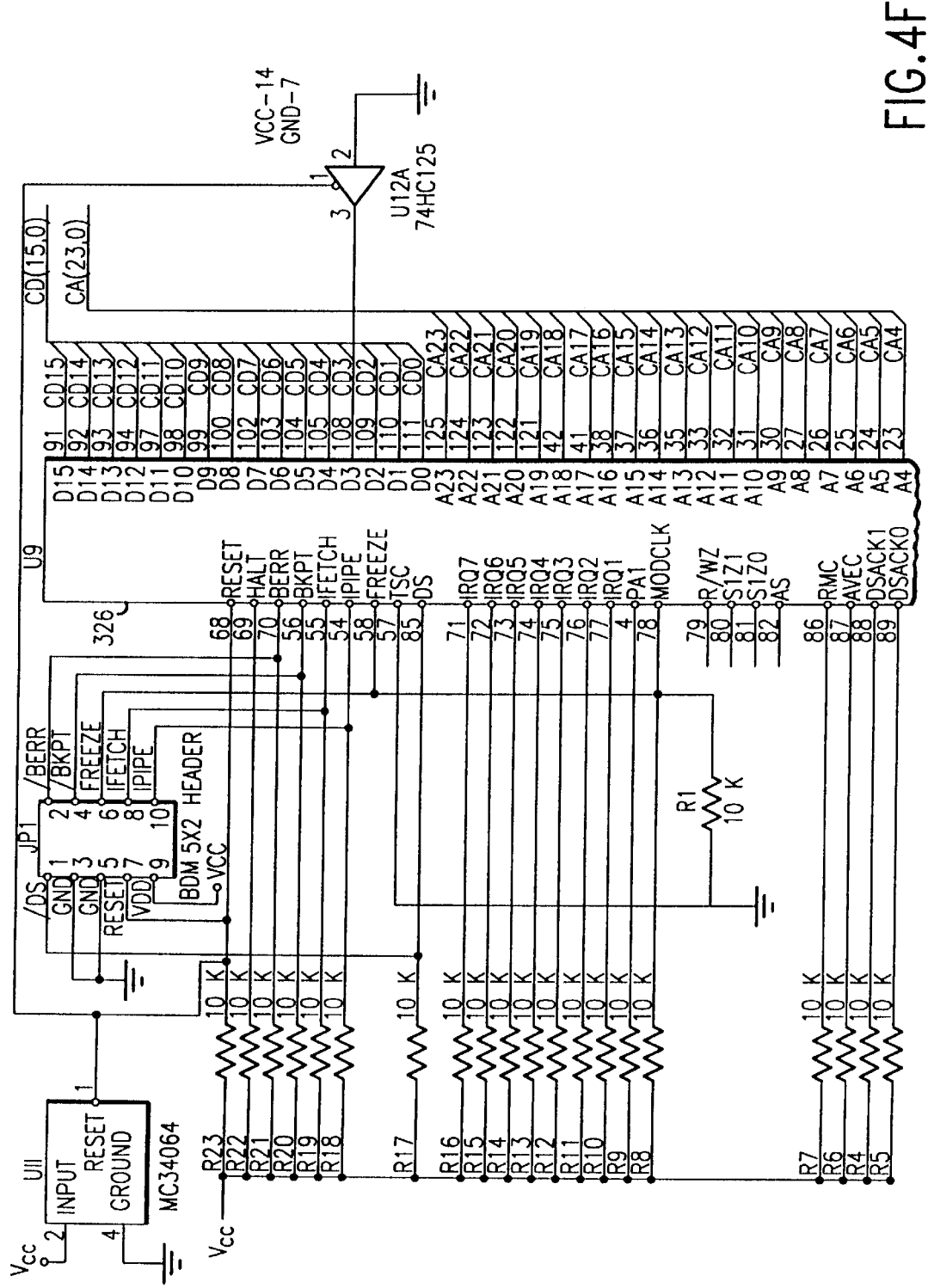
Figure 4H:
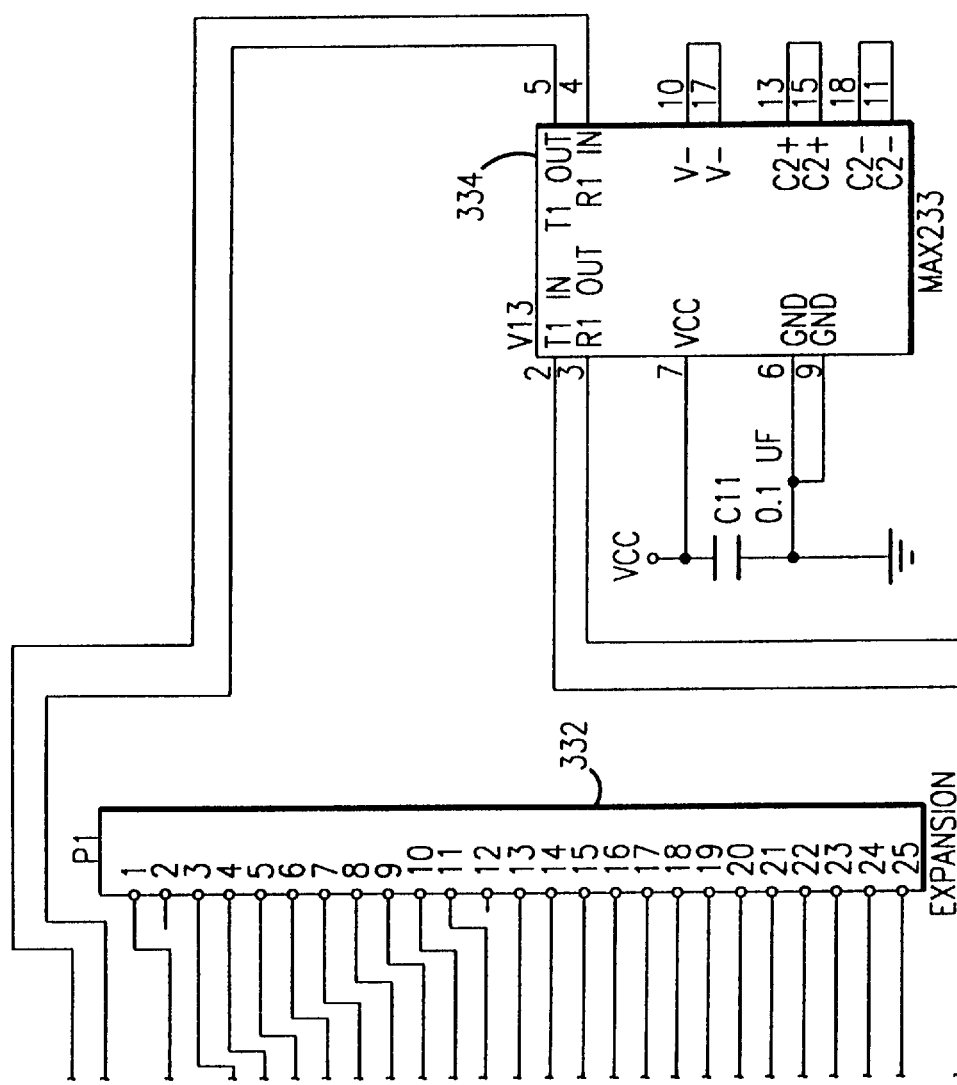

FIG. 3 is a block diagram of applications module 300, which further indicates the relationship of the components of the subscriber terminal module to the components of the applications module. Applications module 300 includes buffer and latch circuitry 320 for buffering and latching data communicated between the subscriber terminal module and the applications module; decoder circuit 322 for decoding address data from the subscriber terminal module; a first memory 324 such as an EPROM for providing additional external memory usable by control microprocessor 128 of subscriber terminal module 140; a processor 326; a dual port memory 328 such as a dual port SRAM for effecting communication between control microprocessor 128 and processor 326; programming control register and second memory 329 such as an EPROM for storing program code for processor 326; a third memory 330 such as an SRAM usable by processor 326 for storing stack and data variables associated with the execution of the control program; an expansion connector 332 for connecting applications module 300 to external devices; and a transceiver 334 for interfacing external devices connected to expansion connector to processor 326. EPROM 324 may, for example, be a 256 kbyte×8 flash EPROM; dual port SRAM 328 may, for example, be an 8 kbyte×8 SRAM; EPROM 329 may, for example, be a 1 Mbyte×16 flash EPROM; and SRAM 330 may, for example, be a 32 kbyte×16 SRAM. Processor 326 is preferably a Power PC processor developed by IBM, Apple and Motorola, although the invention is not limited in this respect. For example, a 68331 microprocessor available from Motorola may be utilized. A 5 V power supply 336 is also provided for applications module 300. Power supply 336 is connected to a power cord (see FIG. 5) which is plugged into an outlet. Thus, applications module 300 is powered separately from subscriber terminal module 140. If the components of the applications module can be powered within the power supply budget of the subscriber terminal module, power to the applications module can be obtained via connector 200.

FIGS. 4A–4H are schematic circuit diagrams of applications module 300 shown in FIG. 3. It is to be emphasized that the present invention is not limited to the particular arrangement or components shown in FIGS. 4A–4H. For example, an application specific integrated circuit (ASIC) and a DRAM may be utilized instead of the dual port RAM 328. However, one advantage of the arrangement of FIGS. 4A–4H is that all the applications module components are off-the-shelf components. In addition, the applications module could be implemented on a card similar to the expansion card described in the above-identified '571 patent if the components of the applications module can be powered within the power supply budget of the subscriber terminal module.

Figure 5:
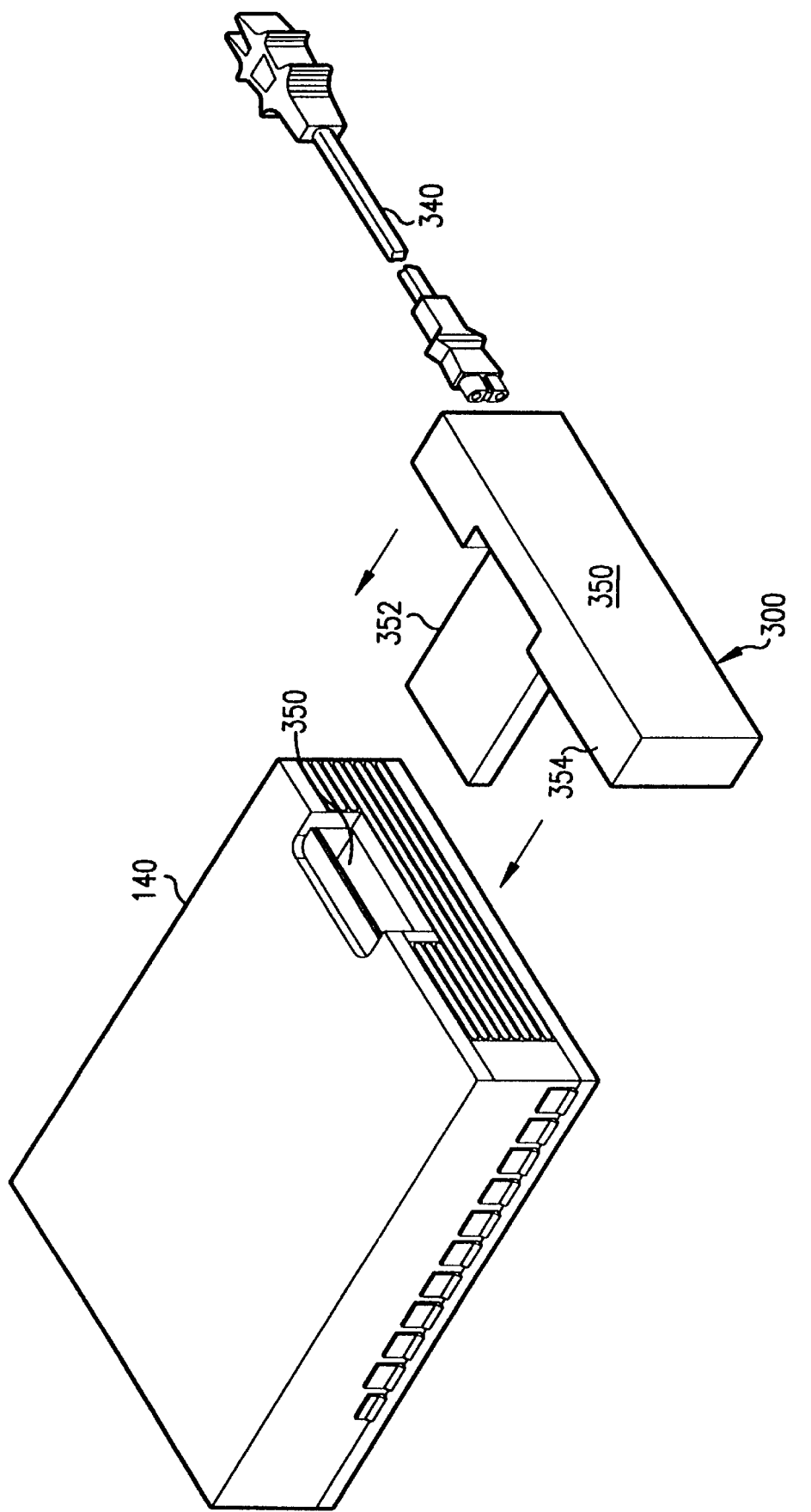
FIG. 5 is a perspective view illustrating the connection of applications module 300 to subscriber terminal module 140.

FIG. 5 is a perspective view illustrating the connection of applications module 300 to subscriber terminal module 140. A power cord 340 is coupled to applications module 300 for powering the components of applications module 300 as noted above. Applications module 300 includes a casing 350 formed of a first housing portion 352 and a second housing portion 354. Each housing portion 352, 354 may, for example, be molded from plastic. Housing portion 352 may enclose a first printed circuit board on which buffer and latch circuitry 320, decoder circuit 322, and first memory 324 are mounted. A first edge of the printed circuit board preferably has a double row (top and bottom) of finger-like edge connection terminals. Second housing portion 354 may enclose a main, second printed circuit board into which a second edge (which is opposite to the first edge) of the first printed circuit board is plugged. The second printed circuit board may, for example, mount processor 326, dual port RAM 328, EPROM 329, SRAM 330, expansion connector 332, and transceiver 334. The first housing portion of applications module 300 preferably has a protective door which pivots about spring loaded hinges as shown, for example, in commonly assigned U.S. Pat. No. 5,367,571. The protective door pivots out of the way when the first housing portion of applications module 300 is inserted into a slot 350 of subscriber terminal module 140. The spring returns the door to its protective position when the applications module is removed. Applications module 300 is preferably coupled to subscriber terminal module 140 in a manner similar to the manner in which an expansion card is coupled to a subscriber terminal as described in the above-mentioned '571 patent and reference may be made thereto for a detailed explanation of the coupling. A bracket and screws (not shown) may be utilized to fixedly secure the applications module to the subscriber terminal module.

In accordance with the present invention, the program code, as well as other information, in the memories of both a subscriber terminal module (such as subscriber terminal module 140) and an associated application module (such as applications module 300) may be updated. In order to implement such updates to the memory of the subscriber terminal module, the subscriber terminal module includes a first boot-loader routine (in ROM, for example) which is responsive to various transactions for erasing and updating program code in internal memory 134 and/or external memory 324. One of the program code updates which may be provided to subscriber terminal module 140 is a downloaded, second boot-loader routine which is resident in memory 134 and/or memory 324 and which is executable by control microprocessor 128 for updating program code in memory 329 of applications module 300.

Specifically, program code is downloadable from headend 10 to one or more of the applications modules. For purposes of the discussion below, it will be assumed that program code is to be downloaded to applications module 300 which is connected to subscriber terminal module 140. In order to accomplish such downloading, the second boot-loader routine and various I/O routines are addressably or globally transmitted from headend 10 over distribution network 52 to subscriber terminal module 140. This second boot-loader routine is stored in memory 134 and/or memory 324 and is then executable by control microprocessor 128 for loading new or updated program code into EPROM 329 of applications module 300. It will of course be appreciated that the downloaded, second boot-loader routine will be a routine which is appropriate for interfacing with the particular processor and memory types which are utilized in the applications module and includes, for example, appropriate instructions and algorithms for programming the EPROM 329 of applications module 300. In order to download the new or updated program code to applications module 300, a transaction may be transmitted to subscriber terminal module 140 for instructing the second boot-loader routine resident in memory 134 and/or memory 324 to erase the contents of EPROM 329 of applications module 300. Additional transactions are identified as including program code which is intended for applications module 300 and the second boot-loader routine is executed to appropriately supply and load the program code in these additional transactions in EPROM 329 of applications module 300. Specifically, program code transactions intended for applications module 300 include a program code portion which is the program code for the applications module and an identification portion. When the transaction is identified as a transaction containing program code for the memory of the applications module, control microprocessor 128 executes the second boot-loader routine and appropriately routes and loads the program code portion of the transaction into EPROM 329 of applications module 300. Once the entire program is received by applications module 300, the second boot-loader routine provides a signal to processor 326 of applications module 300 indicating that the entire program has been loaded and that processor 326 should begin executing the program. From this time, both processors are operating: control microprocessor 128 operates using program code stored in EPROM 134 and/or EPROM 324 and processor 326 of applications module 300 operates using program code stored in EPROM 329.

In short, the second boot-loader routine is resident in subscriber terminal module 140 and this routine includes the ability to update or initially write EPROM 329 in applications module 300. If, sometime later, it is desired to do a program code update over the network for applications module 300, the second boot-loader routine is executed to erase EPROM 329 of applications module 300 and to start receiving and writing the updated program code to EPROM 329 of applications module 300.

In one embodiment of the present invention, once both processors are running, control microprocessor 128 functions as an I/O processor and is, in effect, a slave to the more powerful applications module processor 326. As noted above, I/O routines may be downloaded to subscriber terminal module 140. These I/O routines provide for fast and efficient routing within the subscriber terminal module of input/output which is initiated by processor 326 of applications module 300. For example, with respect to writing graphics on an associated graphics display screen such as a television, these I/O routines may include routines for the fast and efficient routing of bytes from application module 300 to the appropriate display memory of the DRAM. For sending an RF IPPV transaction, these I/O routines may include routines for routing IPPV data to DRAM 137 and for instructing MCC 104 to transmit the IPPV data to headend 10. As yet another example, the I/O routines may include routines for the fast and efficient routing of transactions received by subscriber terminal module 140 to applications module 130. Even under the master control of processor 326, control microprocessor 128 continues to determine whether received transactions are intended for the subscriber terminal module or the applications module. Updated I/O routines may also be provided to subscriber terminal module 140. In addition, macros for performing particular functions may also be downloaded to subscriber terminal module 140. For example, a macro for drawing a line for a graphics display may be downloaded. Thus, instead of sending pixel data, processor 326 of the applications module may send a command to the subscriber terminal module for executing the macro to draw a line from point A to point B.

The applications module can be connected to a speech recognition, an audio, an RS-232, a printer, a CD ROM, a joystick or a trackball interface. One particularly useful feature for which the applications module may be utilized is in the implementation of a speech interface for a set-top terminal as described in commonly assigned U.S. application Ser. No. 08/367,997, incorporated herein by reference. In such an implementation, a speech recognition algorithm and vocabulary data representative of a vocabulary of spoken sounds or words ("utterances") may be downloaded to the home communications terminal and loaded into EPROM 329 using the second boot-loader program. The vocabulary provides, for example, for spoken control of subscriber terminal module 140 and for spoken control of access to information transmitted from headend 10. Such information may include, but is not limited to, analog video, analog audio, digital video, digital audio, text services such as news articles, sports scores, stock market quotations, weather reports, electronic messages, electronic program guides, database information, software including game programs, and wide area network data. A microphone for receiving speech ("utterance") data from a user may be connected to expansion connector 332 of applications module 300. Thus, applications module 300 receives a speech recognition algorithm and vocabulary data from headend 10 and speech data from a user via the microphone. Processor 326 executes the speech recognition algorithm for comparing the vocabulary data and the spoken data to recognize, for example, commands for controlling subscriber terminal module 140 or commands for accessing information transmitted by headend 10. Applications module 300 then appropriately generates a command for controlling subscriber terminal module 140 or for accessing information transmitted by headend 10 and supplies this generated command to subscriber terminal module 140. The I/O routines of subscriber terminal module 140 appropriately route the generated command.

The vocabulary data transmitted from headend 10 to applications module 300 may, for example, be phoneme data. A phoneme is a member of the set of the smallest units of speech that serve to distinguish one utterance from another in a language or dialect. Each sound or spoken word in the vocabulary may thus be represented by a combination of phonemes. Alternatively, the vocabulary data may be template data generated by having a person or persons speak each sound or word. Each spoken sound or word in the vocabulary may thus be represented by a respective corresponding template.

In another useful implementation, the applications module may be used in the implementation of a video games system using a television as a display screen as described in commonly assigned application Ser. No. 08/352,162, which is incorporated herein. Game players are generally known for receiving therein a game cartridge, disc or other game software media. In particular, a specially suited game cartridge slot is typically provided in the game player for receiving a sixteen or thirty-two bit parallel edge connector or other means of intercommunicating with the game player. In accordance with the present invention, the game cartridge is replaced with the applications module equipped with a suitable connector which is plug-in compatible with the game player. Games programs may be transmitted over distribution network 52 and loaded into EPROM 329 of applications module 300. In this manner, game player apparatus, already available in large commercial quantity and played by many already throughout the world, need not be replaced. Game data received by applications module 300 appears to the game player in the same manner as that data received from a game cartridge presently available through commercial outlets in great quantities. One example of a game player is the so-called Genesis® game player system available from Sega Corporation of America. Other similar systems are available from other manufacturers including, but not limited to, Atari and Nintendo. Typically, such a game player has its own microprocessor, random access memory and program memory for storage of initialization, basic input/output services (BIOS), game access programs and the like. The game player is actuated via key, joystick or other known controls during initialization and game play modes of operation.

An advantage of using the applications module described above is that there is an increased ability of third-parties to develop software for implementing features in the home communications terminal. Using a widely available and powerful processor such as a Power PC processor permits a greater number of developers to write software for implementing features in the home communications terminal. The home communications terminal can be implemented with a generic application programmer interface which would allow I/O routing within the subscriber terminal module. This arrangement could be packaged with an operating system to permit third party development of applications.

Figure 6C:
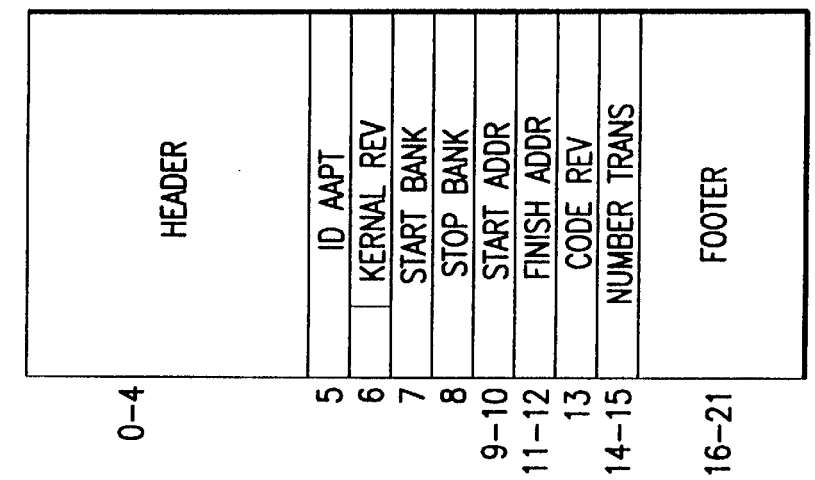

As noted above, the memory space of the subscriber terminal module and the applications module can be downloaded with new program code. As further noted above, this program code may be code for implementing a speech interface and/or a video game player. Specifically, the memory space of the subscriber terminal module and the applications module may be downloaded with new program code through a series of transactions such as a download parameters transaction and a download program code transaction to be described below. Of course, these transactions are for exemplary purposes only and other methods may be used to download the program code as will be apparent to those in the art. A download parameters transaction for the home communications terminal illustrated in FIG. 2 is more fully shown in FIGS. 6A–6F. The download parameters transaction is 22 bytes in length and has six versions. A first version (FIG. 6A) is for an external memory; a second version (FIG. 6B) is for internal memory; and a third version (FIG. 6C) is for applications module memory. Any of these transactions may be addressed (FIGS. 6A, 6B, and 6C) or global (FIGS. 6D, 6E, and 6F) to provide versions four, five, and six.

Figure 6B:
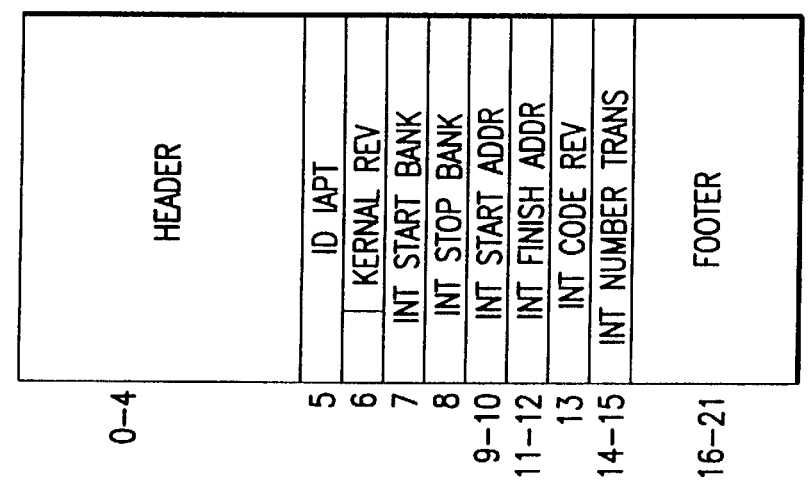
Figure 6A:
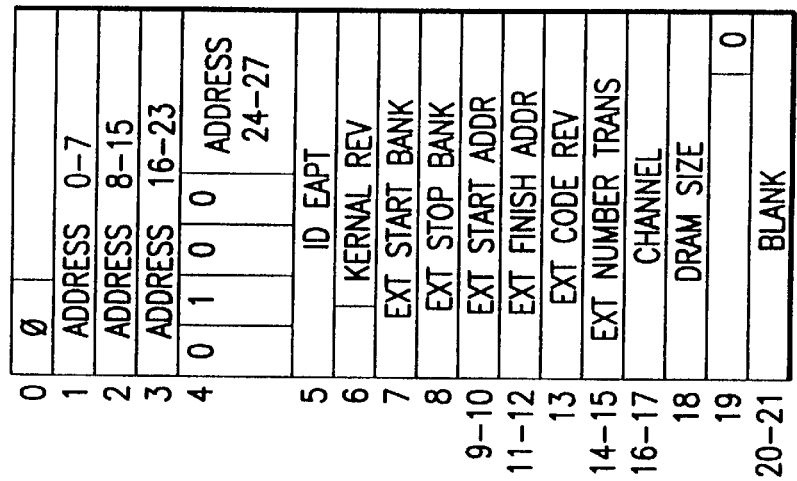

The addressed version of the download parameters transaction for applications module configurations will now be more fully described with respect to FIG. 6A. Bit 1 of byte 0 of the transaction indicates that it is an addressed transaction, and bytes 1–3 provide 24 bits of addressing capability. Additionally, byte 4 has a least significant nibble which adds 4 more bits of addressing capability. Thus, the transaction may address $2^{28}$ subscriber terminals in the customer base of the subscription system. The most significant nibble in byte 4 includes a code 0100 which indicates, for example, the transaction is directed to secure microprocessor 136. Byte 5 is reserved for a transaction identifier code which indicates it is an external, addressed, parameters transaction (EAPT).

After this header information, bytes 6–19 provide parameter definition information concerning the downloading of program code to the memory space. The least significant nibble in byte 6 includes a code that identifies the kernel revision for the first boot-loader program. Bytes 7 and 8 indicate the number of the starting bank and number of the ending bank for the memory 310 of the external memory. Bytes 9 and 10 are the first address of the starting bank of external memory and bytes 11 and 12 are the last address of the end bank of external memory. Byte 13 is the program code revision number and bytes 14 and 15 are the expected number of downloadable transactions that it will take to load the code. Bytes 16 and 17 indicate the frequency of the channel on which the downloadable program code transactions will be transmitted. Byte 18 is an indication of the volatile memory size, in this case the size of the DRAM 137. Byte 19 is an indication of whether the system is commanding an immediate software download or whether the downloading should occur sometime in the future.

The addressed download parameters transaction (FIG. 6B) for the internal memory (IAPT) is identical in the header section (bytes 0–4) to the addressed transaction for external memory (FIG. 6A). Byte 5 is reserved for a transaction identifier code which indicates it is an internal, addressed, parameters transaction (IAPT). The least significant nibble in byte 6 includes a code that identifies the kernel revision for the first boot-loader program. The structure is also similar in that there are indications in bytes 7–12 for the internal starting bank and internal ending bank, along with their first address and last address. Additionally, the program code revision for the internal memory is stored in byte 13 of the transaction and the expected number of downloaded program code transactions is provided in bytes 14 and 15. The footer (bytes 16–21) are also similar to the external transactions.

The addressed download parameters transaction (FIG. 6C) for the applications module memory (AAPT) is identical in the header section (bytes 0–4) to the addressed transaction for external and internal memory (FIGS. 6A and 6B). Byte 5 is reserved for a transaction identifier code which indicates it is an applications module, addressed, parameters transaction (AAPT). The least significant nibble in byte 6 includes a code that identifies the kernel revision for the second boot-loader program. The structure is also similar in that there are indications in bytes 7–12 for the applications module memory starting bank and internal ending bank, along with their first address and last address. Additionally, the program code revision for the applications module memory is stored in byte 13 of the transaction and the expected number of downloaded program code transactions is provided in bytes 14 and 15. The footer (bytes 16–21) are also similar to the external and internal transactions.

The global download parameters transaction versions (FIGS. 6D, 6E, and 6F) of the addressed transaction versions differ only by having a zero in bit 1 of byte 1, no address, and different transaction identifiers. The parameters definitions, bytes 6–21, contain the same data in the same format for both addressed and global transactions.

Figure 7:
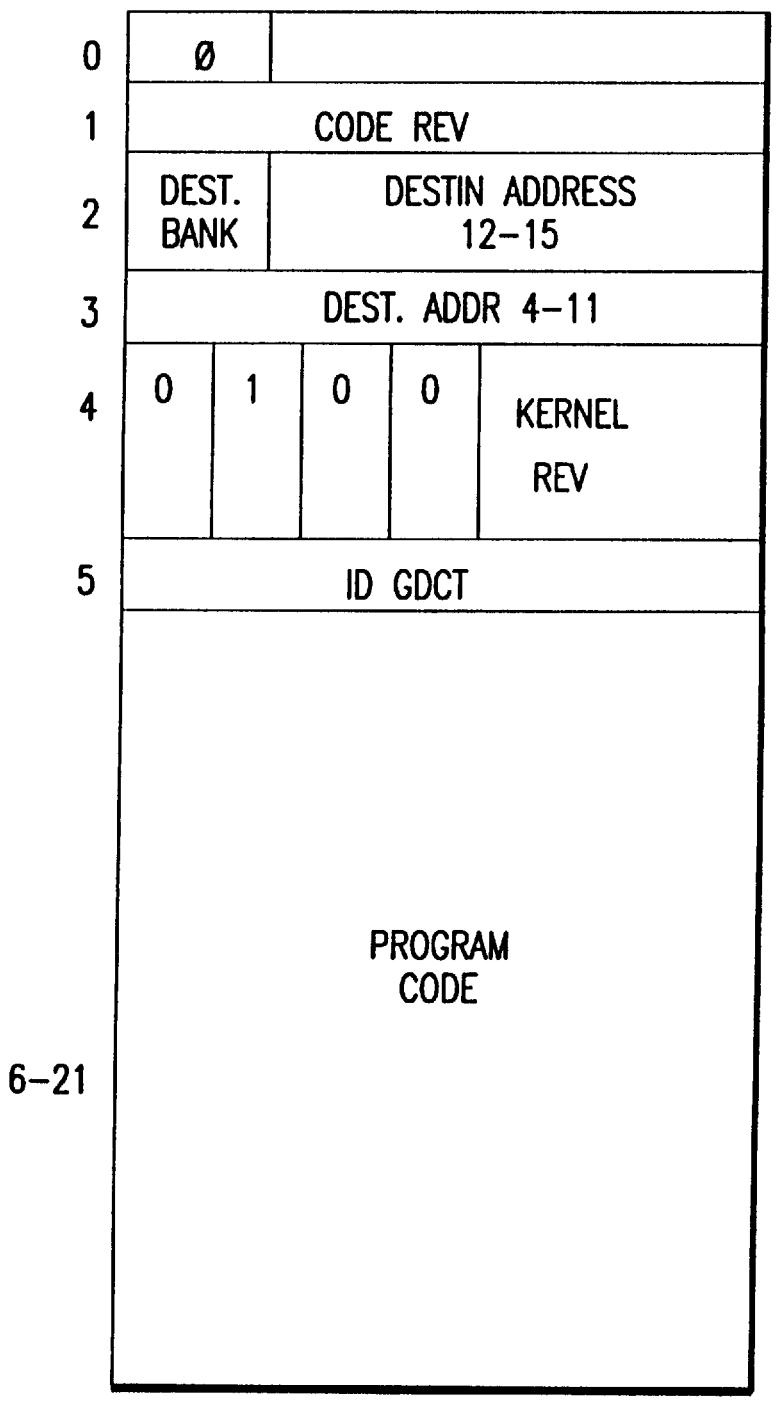
FIG. 7 is a pictorial representation of the download program code transaction which the system uses to download program code which will supplement or replace program code in the memory space of the subscriber terminal module or the applications module illustrated in FIGS. 2 and 3.

A download program code transaction is more fully illustrated in FIG. 7. The first bit in Byte 1 is a zero indicating that the download program code transaction is a global transaction. The transaction could be addressed but sending large amounts of addressed transactions taxes the system assets. Byte 2 of the transaction indicates the code revision number. Byte 3 indicates the destination bank (page) for the particular memory configuration and the most significant nibble in byte 3 and all of byte 4 are used for address bits 4–15 of the bank. Because there are 16 bytes of code in each program code transaction, the destination address points to the first address of a 16 byte segment. The first byte is loaded at this address in the destination bank and the following bytes loaded sequentially in the same sequence that they are stored in the transaction. In this manner 16 banks of 64k memory can be reloaded by a very simple transaction. Byte 5 has a nibble which indicates to which microprocessor the transaction is intended and the second nibble of the byte indicates the kernel revision for the transaction. Byte 6 indicates the transaction is a download program code transaction. Bytes 6–21 are the actual program code bytes which are downloaded to the appropriate memory space. Each transaction loads 16 bytes of code into the memory space of either subscriber terminal module 140 or applications module 300.

In this manner a large amount of program code can be efficiently and accurately downloaded to the memory space of applications module 300 and subscriber terminal module 140. By having the download parameters transaction either addressed or global, internal, external, or applications module, the system allows for an efficient addressing of the program code to either all terminals, a group of terminals or even a single terminal. By indicating which code revision is acceptable to the terminal and indicating the code revision in the download transaction, the addressed terminals may even be further downloaded with different revisions or the same revision for a different microprocessor. Also the inclusion of the kernel revision provides for the update of the microprocessors or new models to allow compatible code conversion. Moreover, the distinction between external, internal, and applications module memory can be used to direct program code as necessary.

Normally, the headend 10 will be constantly broadcasting a standard software program that all subscriber terminals should be using. This program code advantageously can be addressed to all terminals by a global download parameters transaction which may indicate it is for external, internal, or applications module memory. New terminals as they enter the subscriber base are automatically downloaded with the correct software by these transactions. Code revisions to the entire subscriber base can be made by a global download parameters transaction with a new revision number stored therein. The system supports different kernel revisions so that different models of subscriber terminal module and applications modules may be used in the same system. The addressed parameters transactions may then be used to reach smaller groups, or even single terminals, with special software. It is envisioned that the headend will broadcast several versions of software simultaneously and the download parameters transactions will be used to allow the subscriber terminals to select the one for its particular purpose.

Figure 8:
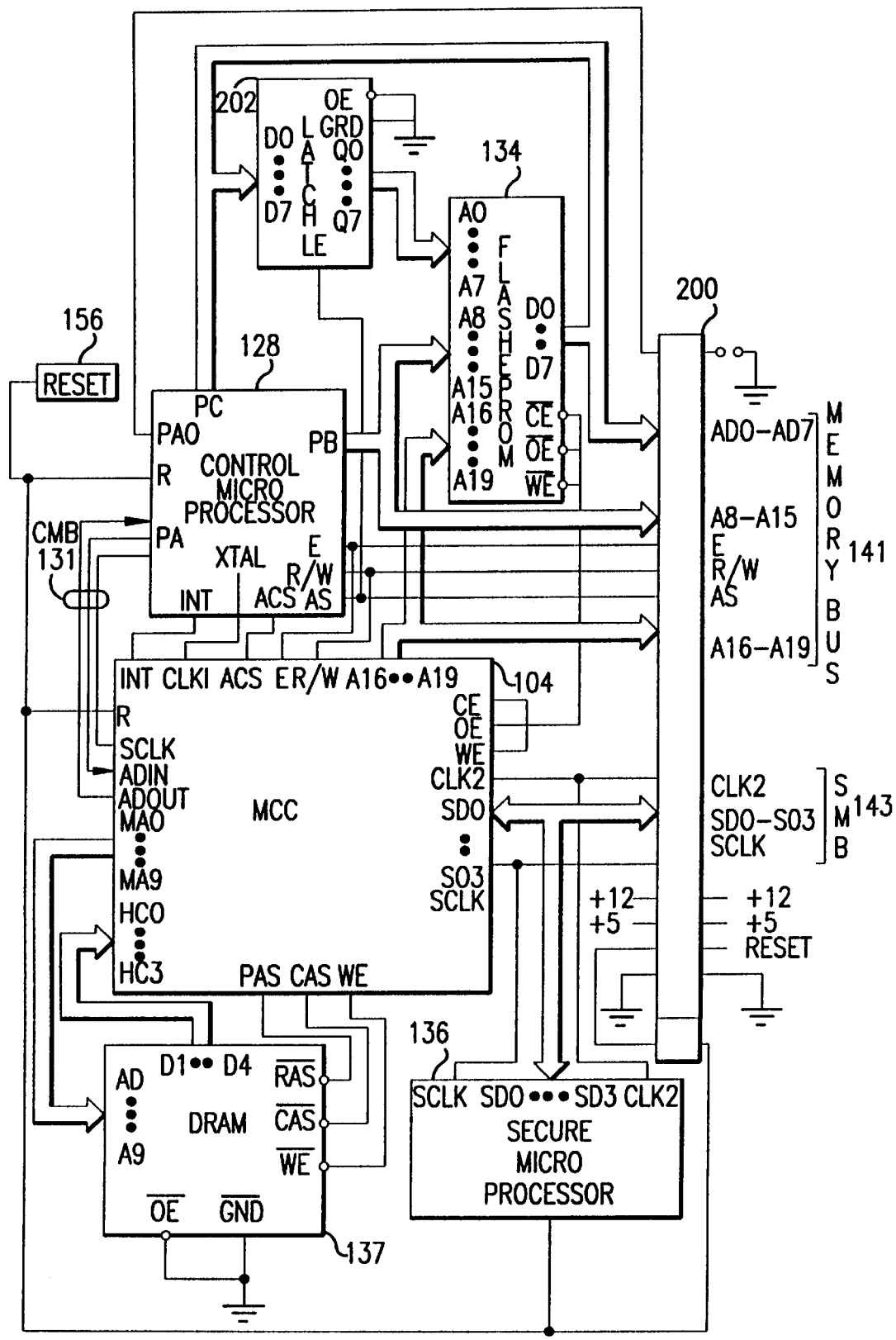
FIG. 8 is a detailed electrical schematic diagram of the memory architecture of the home communications terminal illustrated in FIGS. 2 and 3.

The memory space and memory control of home communications terminal 40 will now be more fully described with reference to the schematic in FIG. 8. The memory space of control microprocessor 128 is shown as 1 megabyte in length. Of course, this is for exemplary purposes only and the invention is not limited in this respect. Control microprocessor 128 uses address lines A0–A19 to be able to reach this size of memory in blocks or pages of 64k bytes. Addresses A0–A15 are addresses found on a particular 64k page, which are then designated by the extended addresses A16–A19 from MCC 104.

The physical memory of the memory space can be either internal, external, or applications module. The internal memory is provided by EPROM 134 of the subscriber terminal, the external memory by EPROM 324, and the applications module memory by EPROM 329. Control microprocessor 128 generates the page addresses A0–A15 from 2 bidirectional 8 bit I/O ports PB and PC. Control processor 128 time-multiplexes the port C lines to be both address and data lines AD0–AD7 and applies them to a data latch 202 which maintains the address word while it reads data from the same lines. The address lines are applied to the address inputs A0–A15 of the internal memory 134, in FIG. 8, a 128k Flash EPROM (pages 0 and 1). Data from the memory 134 is output from its data outputs D0–D7 on the port C data lines AD0–AD7. The extended address lines A16–A19 needed by the memory to address the 64k pages of memory are provided by MCC 104 to determine page assignment. Additionally, MCC 104 provides the control signals to the chip enable input *CE, output enable input *OE, and write enable input *WE to memory device 134.

Control microprocessor 128 communicates with MCC 104 over a serial bus with a transmit line connected to the address in input ADIN and a receive line connected to the address input ADOUT. An address clock on line ACLK provides a clock signal to synchronize the transfer of data between control microprocessor 128 and MCC 104. A chip select signal ACS is used to select MCC 104 and to separate control data. MCC 104 also has a connection to the enable output E, and the read/write memory line R/W of control microprocessor 128. MCC 104 further provides a master clock signal CLK1 to the XTAL input of control microprocessor 128 to run the device. MCC 104 provides a data ready signal INT which is coupled to the interrupt input of control microprocessor 128 to indicate that transaction data has been received and is stored in DRAM 137.

The DRAM 137 is controlled by memory controller 112 of MCC 104 via address lines A0–A9, row address strobe *RAS, column address strobe *CAS, and a write enable signal *WE. Data in 4 bit half bytes is read from and written to the data terminals D1–D4 of the memory device by memory controller 112. The output enable input *OE and ground input to DRAM 137 are grounded. Secure microprocessor 136 communicates over the secure microprocessor bus (SMB) with MCC 104. The SMB comprises 4 input/output data lines SD0–SD3 and a serial clock line SCLK to time the communications. Memory controller 112 additionally provides a master clock CLK2 to run secure microprocessor 136.

Extensions of control microprocessor memory bus 141 are provided by memory extension connector 200. This extension connector is a 34 pin, edge connector which can be connected to other printed circuit boards within the subscriber terminal module cover (on board) or provided to plug-in devices external to the subscriber terminal module such as applications module 300. The expansion connector includes the address and data bus of control microprocessor 128, lines AD0–AD7 and lines A8–A15. Further, the extended address lines A16–A19 are provided to extension connector 200 from MCC 104. In addition, expansion connector 200 is electrically coupled to SMB 143, which provides the serial clock SCLK and input/output data lines SD0–SD3 to devices coupled to the connector. Still further, control lines from control microprocessor 128 including the enable output line E, the read/write line RIW, and the address strobe line AS are coupled to connector 200. Control microprocessor 128 reads an input port line PAO to tell whether applications module 300 is inserted in the connector. The input port line is connected to a pin of connector 200 which can be grounded when applications module 300 is inserted. Expansion connector 200 is supplied with +12V, +5V power connectors and ground. These connectors are utilized by the components of an expansion card if such a card is plugged into connector 200. However, as described above, the components of applications module 300 may be powered by a separate power supply. Expansion connector 200 can also provide for renewable security as described in the above-mentioned U.S. Pat. No. 5,367,571 by providing the secure microprocessor bus SMB 143 as a connection to the expansion space.

Figure 9:
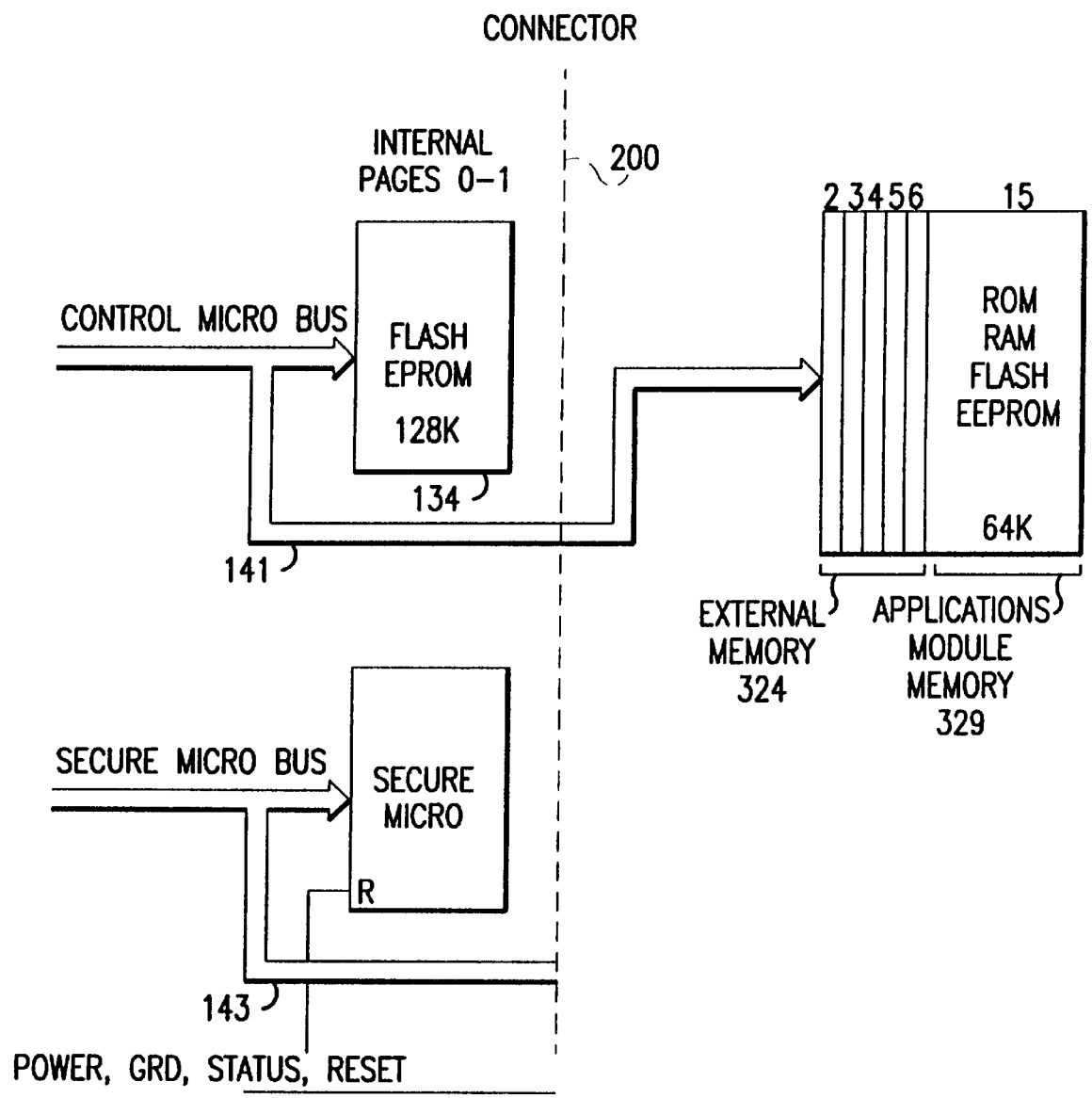
FIG. 9 is a detailed memory map of the memory space created by the architecture illustrated in FIG. 8.

Thus, the memory can be divided into internal, external, and applications module memory as seen in FIG. 9 where, based on the feature set and the length of the control program, the internal memory 134 can be reduced to a minimum. Additional feature sets or special features for only certain subscribers or groups of subscribers then may be provided by external memory modules and applications memory modules with the additional costs born by those subscribers benefitting and paying for the additional features. Of course, the invention is not limited to the specific arrangement of internal, external, and applications module memory set forth in FIG. 9. For example, external memory 324 may be reduced or eliminated, with a corresponding increase in applications module memory, if desired.

Further, while the above description refers to "program code," it win be appreciated that the present invention may be utilized to download other information communicated over the distribution network to the home communications terminal as described above.

While there has been shown and described the preferred embodiments of the invention, it will be evident to those skilled in the art that various modifications may be made thereto without departing from the spirit and scope of the invention as set forth in the appended claims.

I claim:

1. A home communications terminal for use in a communications network, comprising:
   an applications module including:
      a first memory including a first memory portion; and
      a first processing unit for executing program code stored in the first memory portion of said first memory; and
   a subscriber terminal module including:
      a second memory including a first memory portion for storing a first boot-loader program, and a second memory portion for storing a second boot-loader program; and
      a second processing unit for executing the first boot-loader program to load program code in the second memory portion of said second memory and for executing the second boot-loader program to load program code in the first memory portion of said first memory.

2. The home communications terminal according to claim 1, wherein said subscriber terminal unit further includes:
   a receiver for receiving data transmitted over said communication network, wherein the received data includes the second boot-loader program and the program code to be loaded in the first memory portion of said first memory.

3. The home communications terminal according to claim 2, wherein the received data further includes I/O routines which are stored in the first memory portion of said second memory and which are executable by said second processing unit.

4. The home communications terminal according to claim 3, wherein the second memory further includes a video graphics memory portion for storing graphics data,
   wherein the program code executed by said first processing unit generates graphics data and supplied the generated graphics data to said subscriber terminal module, and
   wherein the I/O routines include at least one routine for routing the generated graphics data supplied to said subscriber terminal module to said video graphics memory portion of the second memory.

5. The home communications terminal according to claim 1, wherein said applications module further includes a connector assembly for connecting said applications module to external devices.

* * * * *